United States Patent
Ninomiya

(10) Patent No.: US 7,756,392 B2
(45) Date of Patent: Jul. 13, 2010

(54) OPTICAL DISC, RECORDING APPARATUS, REPRODUCING APPARATUS, PROGRAM, COMPUTER-READABLE RECORDING MEDIUM, RECORDING METHOD AND REPRODUCING METHOD

(75) Inventor: Masako Ninomiya, Hiroshima (JP)

(73) Assignee: Panasonic Corporation, Osaka (JP)

( * ) Notice: Subject to any disclaimer, the term of this patent is extended or adjusted under 35 U.S.C. 154(b) by 812 days.

(21) Appl. No.: 11/638,446

(22) Filed: Dec. 14, 2006

(65) Prior Publication Data

US 2007/0092231 A1  Apr. 26, 2007

Related U.S. Application Data

(63) Continuation of application No. 09/995,757, filed on Nov. 29, 2001, now Pat. No. 7,187,842.

(30) Foreign Application Priority Data

Nov. 29, 2000  (JP)  ............................. 2000-362278

(51) Int. Cl.
*H04N 5/91* (2006.01)
(52) U.S. Cl. ................ 386/52; 386/47; 386/94; 386/109; 386/112; 386/125; 386/124; 386/126; 360/60; 380/201
(58) Field of Classification Search ................ 386/126, 386/52, 94, 90, 47, 112, 109, 124, 125; 360/60; 380/201–209
See application file for complete search history.

(56) References Cited

U.S. PATENT DOCUMENTS

| 5,048,012 A * | 9/1991 | Gulick et al. ............... 370/498 |
| 5,729,516 A * | 3/1998 | Tozaki et al. ............. 369/53.21 |
| 5,940,351 A * | 8/1999 | Fujinami et al. ......... 369/30.04 |
| 6,327,420 B1 * | 12/2001 | Furukawa ..................... 386/52 |
| 6,999,674 B1 * | 2/2006 | Hamada et al. ............... 386/95 |
| 7,187,842 B2 * | 3/2007 | Ninomiya ..................... 386/52 |
| 7,215,871 B2 * | 5/2007 | Lin et al. ....................... 386/52 |
| 7,469,093 B2 * | 12/2008 | Ishii ............................ 386/52 |
| 7,680,094 B2 * | 3/2010 | Liu ............................. 370/350 |
| 2001/0043799 A1 * | 11/2001 | Okada et al. .................. 386/95 |

(Continued)

FOREIGN PATENT DOCUMENTS

EP   0 847 055 A2   12/1997

(Continued)

*Primary Examiner*—Thai Tran
*Assistant Examiner*—Helen Shibru
(74) *Attorney, Agent, or Firm*—Wenderoth, Lind & Ponack, L.L.P.

(57) ABSTRACT

A recording apparatus for an optical disc is provided which stores a VOB, the recording apparatus performing: receiving, from an operator, an operation to specify a preceding reproduction section and a subsequent reproduction section from the VOB through an interactive screen; duplicating an end vicinity including an end point of the beginning vicinity, and a beginning vicinity including a starting point of the subsequent reproduction section; connecting the duplicated parts to yield a connected part; and writing the connected part to the optical disc in correspondence with Temp_Cell information, the reproduction sections being specified by Cell information which includes Temp_Cell_FLAG, the Temp_Cell_FLAG, 1) if set to be off, indicating a sequential reproduction of the preceding and subsequent reproduction sections, and 2) if set to be on, indicating a reproduction of the connected part between the reproduction of the preceding and subsequent reproduction sections.

5 Claims, 30 Drawing Sheets

U.S. PATENT DOCUMENTS

| | | | |
|---|---|---|---|
| 2002/0145702 A1* | 10/2002 | Kato et al. | 352/1 |
| 2006/0013564 A1 | 1/2006 | Hamada et al. | |
| 2007/0092230 A1* | 4/2007 | Ninomiya | 386/126 |
| 2007/0133941 A1* | 6/2007 | Kotani | 386/52 |

FOREIGN PATENT DOCUMENTS

| | | |
|---|---|---|
| EP | 1 020 862 | 7/2000 |
| EP | 1 103 974 | 5/2001 |
| EP | 1 198 133 | 4/2002 |
| JP | 2-162589 | 6/1990 |
| JP | 9-163311 | 6/1997 |
| JP | 10-162560 | 6/1998 |
| JP | 11-39800 | 2/1999 |
| JP | 11-45555 | 2/1999 |
| JP | 11-146335 | 5/1999 |
| JP | 2000-113647 | 4/2000 |
| JP | 2000-339928 | 12/2000 |

* cited by examiner

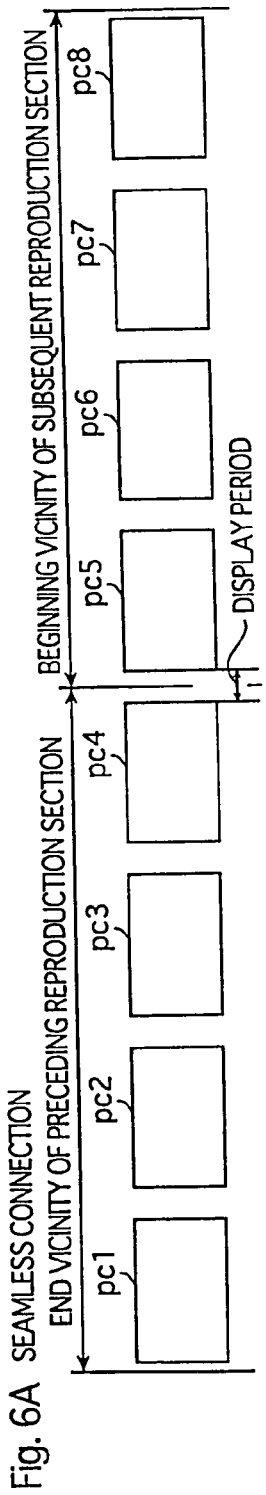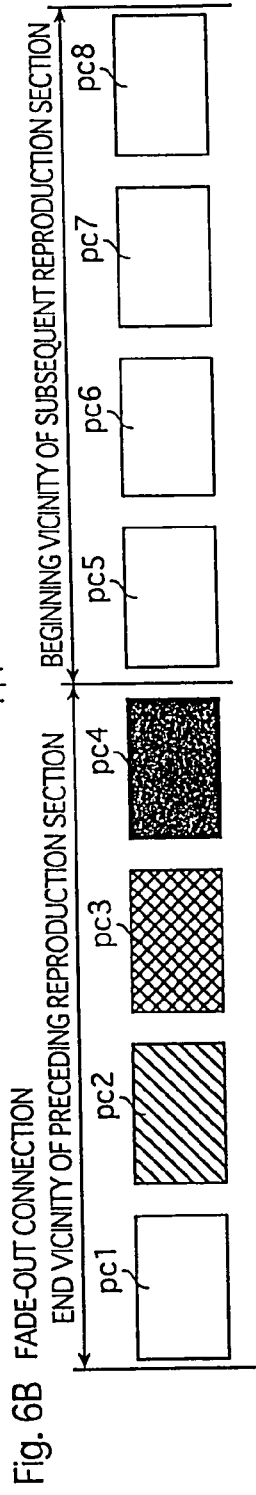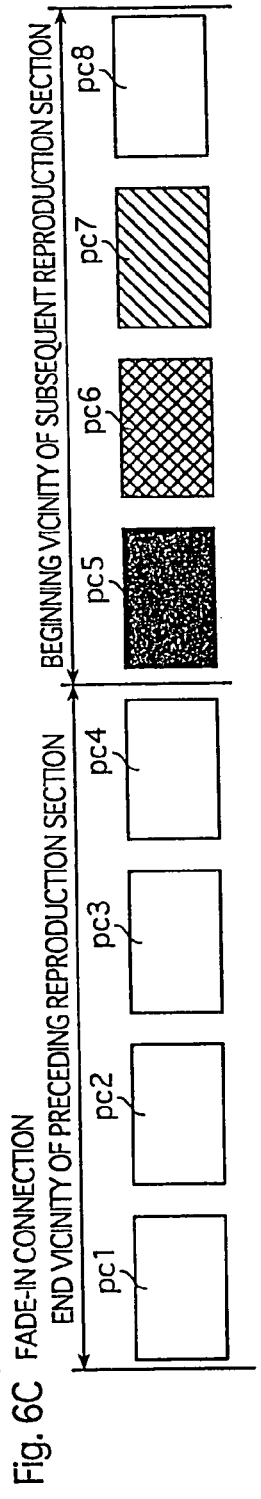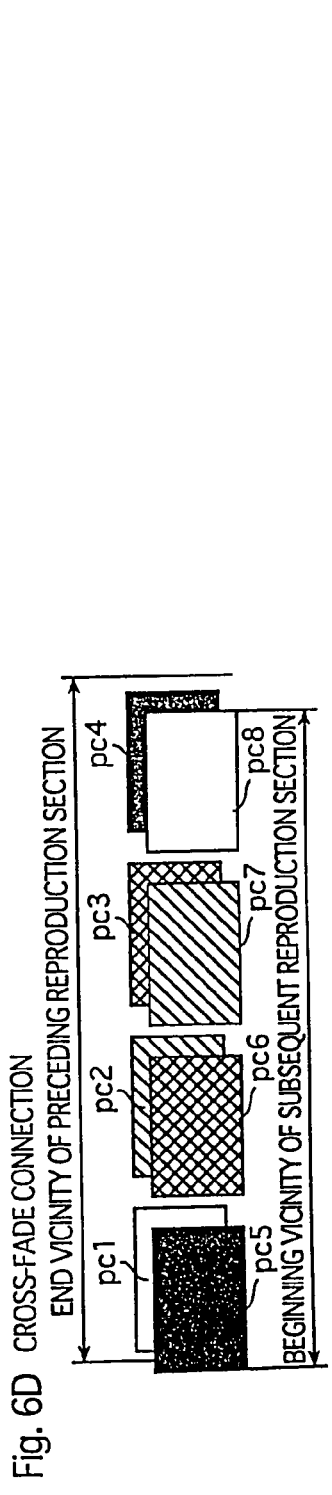

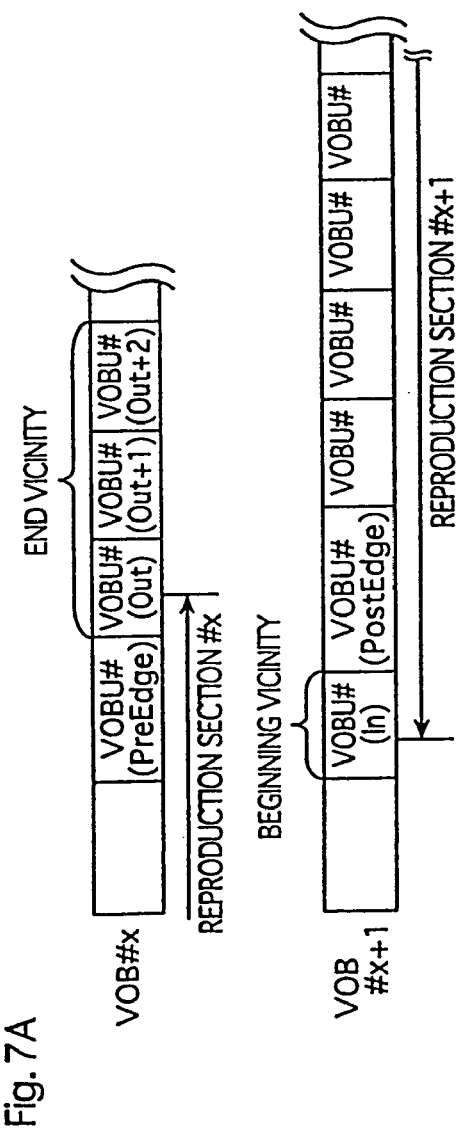
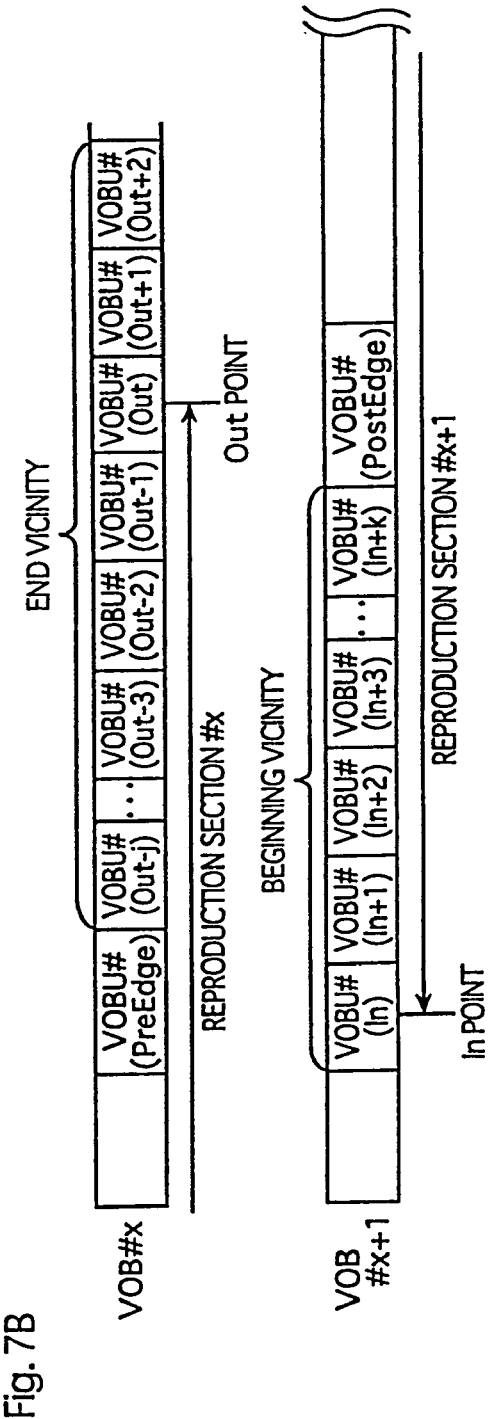
Fig. 7A
Fig. 7B

OPTICAL DISC, RECORDING APPARATUS, REPRODUCING APPARATUS, PROGRAM, COMPUTER-READABLE RECORDING MEDIUM, RECORDING METHOD AND REPRODUCING METHOD

This application is a continuation of application Ser. No. 09/995,757, filed Nov. 29, 2001 now U.S. Pat. No. 7,187,842.

BACKGROUND OF THE INVENTION (1) Field of the Invention

This invention relates to an apparatus for recording and reproducing that performs recording and reproducing for an optical disc such as DVD-RAM, DVD-R, DVD-RW, DVD+RW and the like, and especially to the improvement in editing moving image data recorded on an optical disc.

(2) Description of the Background Art

In editing moving images, risks always exist for damaging the original moving images by mistakes that occur in editing and the like. Consumer appliances that are used by the general public, unlike the ones used by the professionals in producing moving images, require special care. In response to such a request, DVD recording apparatuses that have appeared recently, are equipped with a virtual editing function, in addition to a real editing function. A virtual editing is an editing operation in which pointer information is defined according to a user operation, the pointer information specifying pieces of picture data being the starting and ending points of one reproduction section. Unlike a real editing which requires modification of original moving images, the virtual editing is characterized in that no modification is executed for original moving images. Due to this character, the virtual editing enables a beginner in editing moving images to deal with the moving picture editing without feeling anxious.

On the other hand, in the virtual editing, a seamless image display is not assured when two reproduction sections are reproduced in succession. This is because the two reproduction sections are disposed in separate positions from each other in one disc, which requires a random access to the two reproduction sections.

In addition, moving image data recorded on a DVD contains many pieces of picture data that have been compression-encoded in accordance with the MPEG standard to correlate to pieces of picture data in front and rear. These pieces are assumed to be decoded and reproduced sequentially from the beginning. Suppose here that two reproduction sections that are not originally continuous to each other are specified in the virtual editing. In this case, the last picture data of the preceding reproduction section and the first picture data of the subsequent reproduction section have been encoded on the assumption that they will not be reproduced continuously. This makes it difficult for the two reproduction sections to be reproduced sequentially, due to the encoding method as stated above. As a result, an interruption will often occur at the transition between the two reproduction sections during the reproduction.

On the contrary, moving images in movies or television broadcasts that are edited by professional editors are provided with a variety of visual effects. Compared to the results of these moving images that are familiar to the general public, results of the virtual editing tend to leave users wanting for more.

SUMMARY OF THE INVENTION

The object of the present invention, in view of the stated problems, is to provide an optical disc which can store moving image data, by which a variety of modifications at the transition between reproduction sections are made possible, while a recovery is assured when the editing effort fails.

The above object is achieved by an optical disc storing: moving image data, at least two pieces of reproduction section information that specify a preceding reproduction section and a subsequent reproduction section on the moving image data; a duplicated part which is obtained, for a modification purpose, by duplicating an end vicinity of the preceding reproduction section and a beginning vicinity of the subsequent reproduction section; and a flag, if set to be on, indicates reproduction of a part before the end vicinity and a part after the beginning vicinity via the duplicated part, and if set to be off, indicates sequential reproduction of the preceding reproduction section and the subsequent reproduction section without via the duplicated part.

The above structure provides the ability to duplicate an end vicinity of a preceding reproduction section and a beginning vicinity of a subsequent reproduction section and to write the duplicated part to an optical disc, which enables a variety of modifications for a visual effect to this duplicated part. When the editing succeeds, the optical disc sets the flag on, by which the reproduction apparatus reproduces a part before the end vicinity of a reproduction section and a part after the beginning vicinity of a subsequent reproduction section via the duplicated part. This enables a user to reproduce the editing result.

When the editing fails or is not complete, the optical disc sets the flag off, by which the reproduction apparatus reproduces the preceding and subsequent reproduction sections without the duplicated part.

The above structure assures the recovery when the editing fails, which increases the opportunities for users to provide a variety of editing techniques that involve modification.

Further, the duplicated part is limited to be the end vicinity of the preceding reproduction section and the beginning vicinity of the subsequent reproduction section, which does not increase the data amount which will cause the optical disc to be full in capacity.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 6A-FIG. 6D are diagrams showing each of modification techniques;

FIG. 7A-FIG. 7B are diagrams showing how to set an end vicinity and a beginning vicinity, when the modification technique is a seamless connection;

DESCRIPTION OF THE PREFERRED EMBODIMENTS

First Embodiment

The following is a description about an optical disc according to a first embodiment of the present invention with reference to the drawings. The optical disc according to the first embodiment is a phase change optical disc. Specifically, the optical disc is assumed to be a DVD-RAM, DVD-RW (hereafter abbreviated as "DVD") and the like which can store moving image data in accordance with the DVD-video recording standard.

Figure 1:
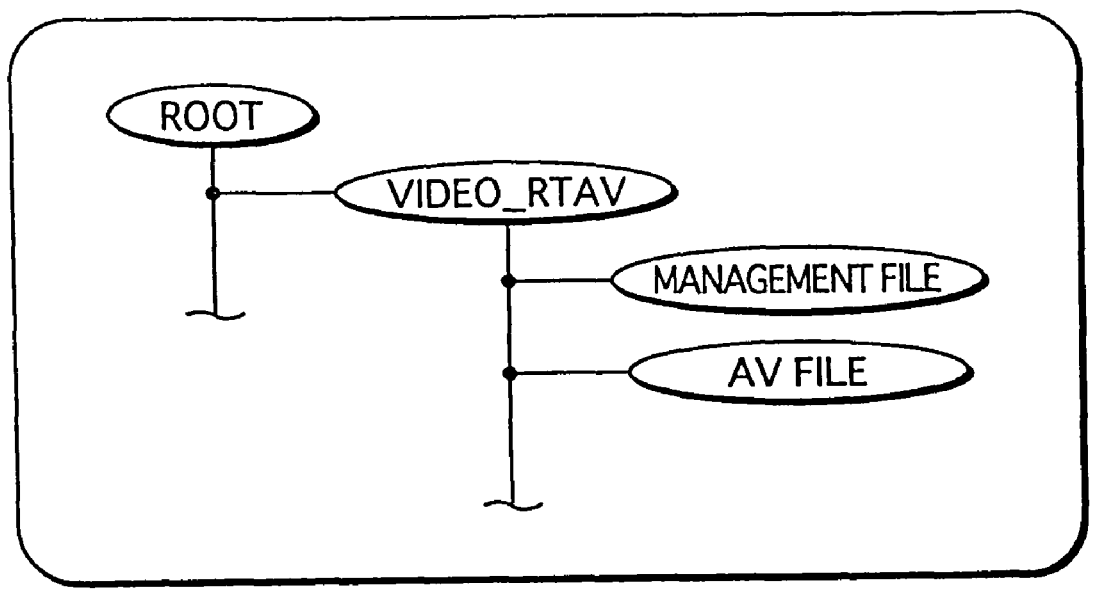
FIG. 1 is a block diagram showing directories and files included in a DVD.

The DVD stores directories and files as depicted in FIG. 1. In FIG. 1, a VIDEO_RTAV (RealTime Recording Audio Video) Directory is provided immediately under a ROOT directory, and under the VIDEO_RTAV directory, an AV file which contains a VOB and a management file which contains a variety of management information is provided.

Figure 2:
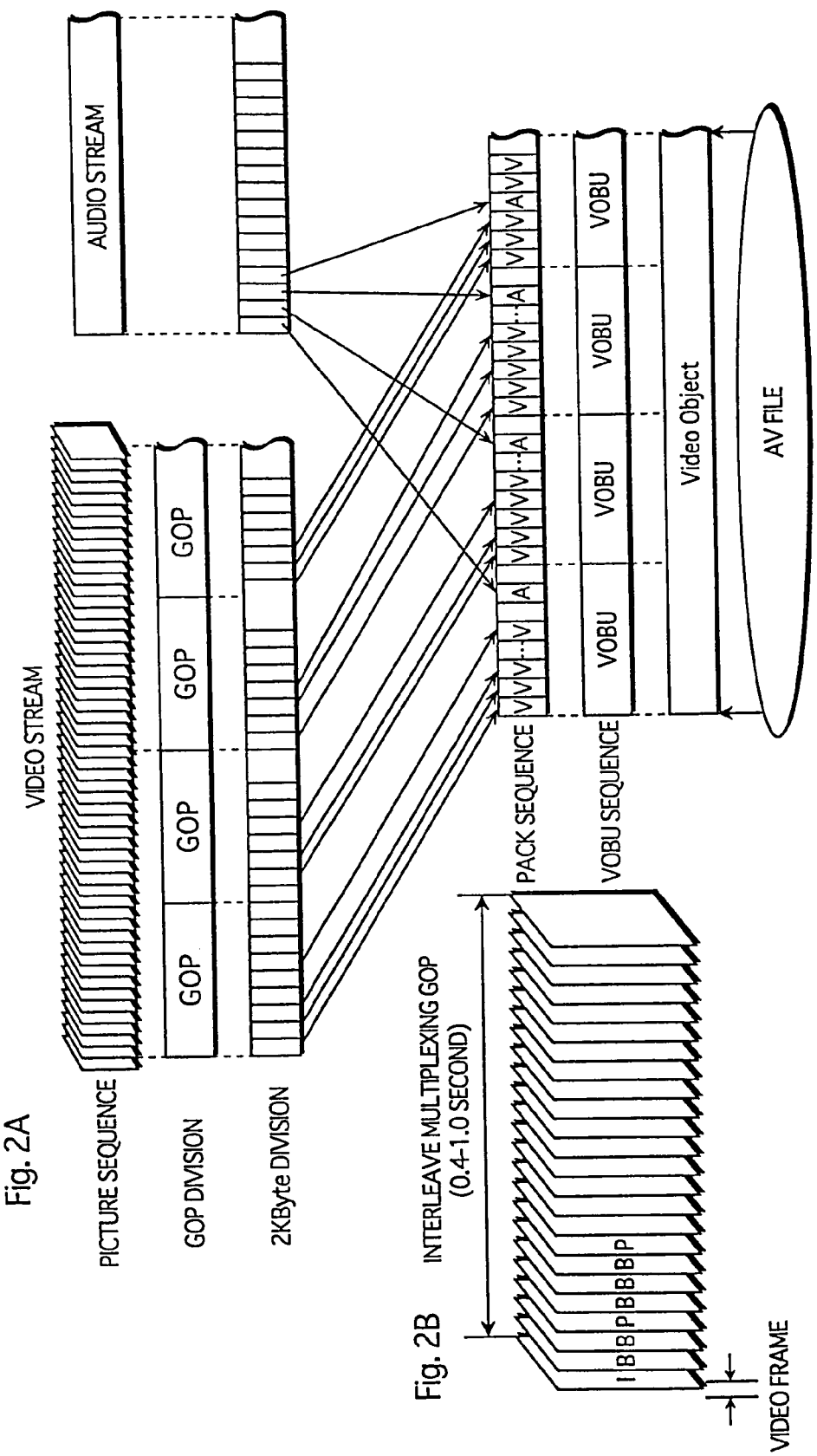
FIG. 2A is a diagram which shows an internal structure of a management file.
FIG. 2B is a diagram detailing a hierarchical structure inside a GOP.

FIG. 2A is a block diagram showing a hierarchical structure of a VOB contained in an AV file. A VOB (Video Object) is a program stream in accordance with an ISO/IEC13818-1 which is obtained by multiplexing a video stream and an audio stream. The VOB does not end with program_end_code. In FIG. 2A, the video stream situated in the first column is a sequence of picture data. A picture data sequence is divided into several GOP as depicted in the second column. Picture data divided in each GOP is then divided into 2K Bytes. On the other hand, the audio stream situated on the right hand side of the first column is divided into 2K Bytes as depicted as the third column. The picture data in 2K Bytes and the audio stream in 2K Bytes are interleave multiplexed to generate a pack sequence depicted in the fourth column. The pack sequence will then be grouped into several VOBUs (Video Object Units). A VOB depicted in the sixth column has a structure of arranging a plurality of VOBUs in chronological order. The dotted leader lines in FIG. 2A makes it clear about which part of the upper logical format corresponds to which part of the lower logical format. According to the leader lines, the VOBU in the fifth column corresponds to the pack sequence in the fourth column, and further to the picture data grouped into a GOP depicted in the second column.

As obvious from the correspondence shown by the leader lines, a VOBU is a unit including at least one GOP which consists of picture data whose reproduction time is approximately 0.4-1.0 second and audio data multiplexed therewith, and is structured as sequences of video pack and audio pack in accordance with a MPEG standard.

Next, picture data included in a GOP is described. FIG. 2B shows an internal structure of a GOP. The picture data is converted into one from the group consisting of a bidirectionally predictive (B) picture, a predictive (P) picture, and an intra (I) picture. The B picture is compressed using correlation with the image to be reproduced either before or after the picture. The P picture is compressed using correlation with the image to be reproduced before the picture, and the I picture is compressed using the spatial frequency response for one frame of image, without using correlations with other pictures. Picture data is displayed in about ⅓₃ second which is one display period (which is also called video frame).

Figure 3:
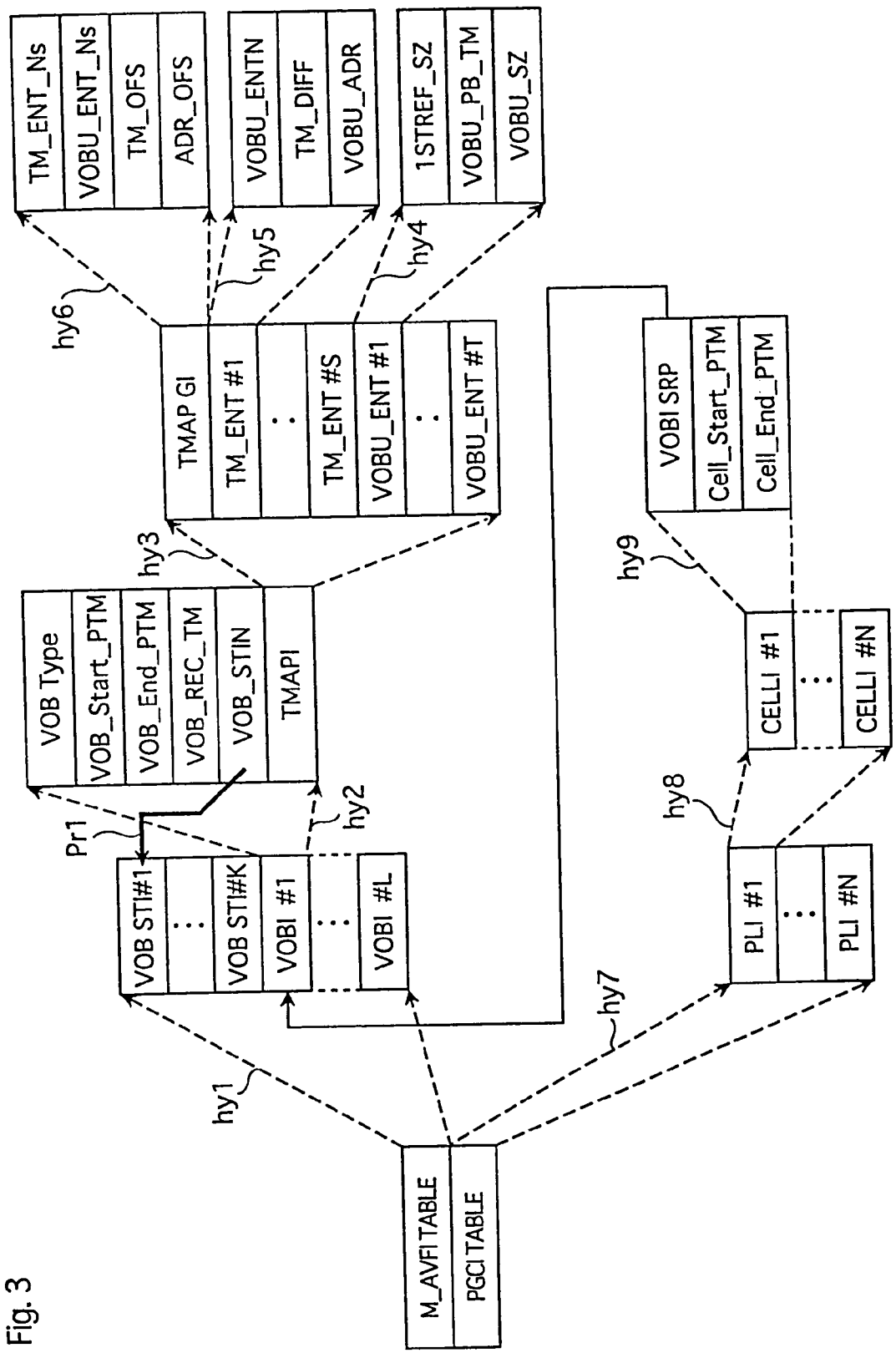
FIG. 3 is a diagram showing an internal structure of a management file.

Next, the management file is described. FIG. 3 is a block diagram showing an internal structure of the management file. The management file consists of a M_AVFI table and a PGCI table as depicted in FIG. 3.

The M_AVFI (Motion AV File Information) table is a management table relating to a VOB. And as the dotted leader line hy1 shows, the management table consists of attribute information relating to VOB (VOBSTI (StreamInformation) #1 . . . #K) and (VOBI#1 . . . #L).

The VOB STI shows video attributes of picture data included in each VOB (such as coding mode, aspect ratio, NTSC/PAL, line 21 information, and so on), and audio attributes of audio data included in each VOB (such as coding mode, number of channels, frequency, and so on).

The VOBI (Video Object Information), as the dotted leader line hy2 shows, consists of a VOB type (VOB_Type), a reproduction starting time showing a time in which a reproduction of the first picture data included in the video stream of the VOB (VOB_Start_PTM) starts, a reproduction ending time which shows a time in which a reproduction of the last picture data included in the video stream of the VOB (VOB_End_PTM) ends, recording date/time information for the beginning of the VOB (VOB_REC_TM), a pointer which specifies, by an arrow Pr1, a particular VOB among the VOB-STI#1 . . . #K (VOB_STIN), and time map information for each VOBU which constitutes the VOB (TMAPI). The TMAPI includes, as the dotted leader line hy3 shows, TMAP_GI, TM_ENT#1~#S, and VOBU_ENT#1~#T.

The VOBU_ENT is information corresponding to each VOBU, and as the dotted leader line hy4 shows, includes a picture size of I picture which is situated at the beginning of the corresponding VOBU (1STREF_SZ), reproducing time corresponding to the VOBU (VOBU_PB_TM), and a size of the corresponding VOBU (VOBU_SZ). The TM_ENT is information showing each time entry in every 10 seconds, and includes, as the dotted leader line hy5 shows, VOBU_ENTN showing the VOBU in which this time entry is included, TM_DIFF which shows the offset time between the beginning of the VOBU identified by the VOBU_ENTN and the time entry, and VOBU_ADR which shows the offset data from the beginning of VOB to the beginning of the VOBU identified by the VOBU_ENTN.

The TMAP_GI is information managing the whole TMAPI, and includes, as the dotted leader line hy6 shows, TM_ENT_Ns which shows the number of time entry set in one VOB, VOBU_ENT_Ns which shows the number of VOBU_ENT included in the TMAPI, TM_OFS which shows the offset between the beginning of the VOB and one time entry, and ADR_OFS which shows the offset from the beginning of the AV file to the beginning of the VOB.

Figure 4:
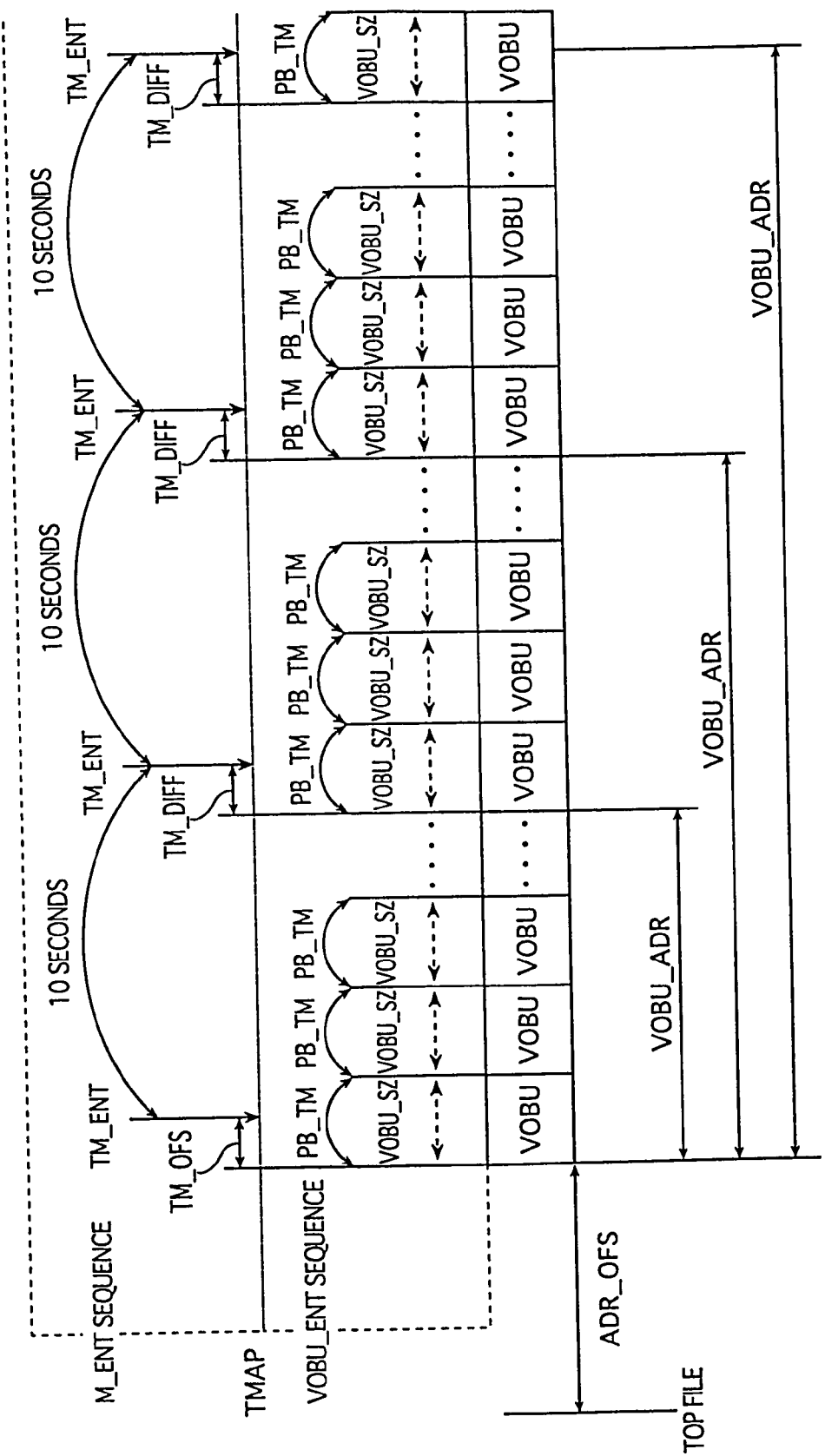
FIG. 4 is a schematic diagram showing a relation between TMAPI and VOBU.

FIG. 4 is a schematic diagram showing the relation between TMAPI and VOBU. As FIG. 4 shows, a correspondence between the reproducing time of each VOBU and the size of the VOBU are identified by the correspondence between VOBU_PB_TM (i.e. PB_TM in FIG. 4) and VOBU_SZ. Further, TM_DIFF in each TM_ENT shows how many seconds after the reproduction of the VOBU starts it reaches where the time entry is. From the TMAPI structure as depicted so far, the VOBU that corresponds to an arbitrary time code is identified.

Next, the PGCI table is described. The PGCI table includes a plurality pieces of Playlist information. The Playlist information (abbreviated as PLI in FIG. 3) is a sequence of CELL information, and is a reproduction list which orders the reproduction apparatus to sequentially reproduce the reproduction sections.

The CELL information (abbreviated as CELLI in FIG. 3) is pointer information showing the reproduction section specified as a result of a virtual editing operation by a user. Specifically, in a virtual editing operation, the beginning of the reproduction section (In point) and the ending thereof (Out point) are specified. The CELL information includes VOBI_SRP which identifies the VOB, Cell_Start_PTM which shows a time code specifying the picture data, in the VOB, which corresponds to the In point, and Cell_End_PTM which is a time code specifying the picture data, in the VOB, which corresponds to the Out point. The time code has the same accuracy in time as the video frame which is the display period of the picture data. The CELL information has the same accuracy in time as the video frame accordingly.

Figure 5:
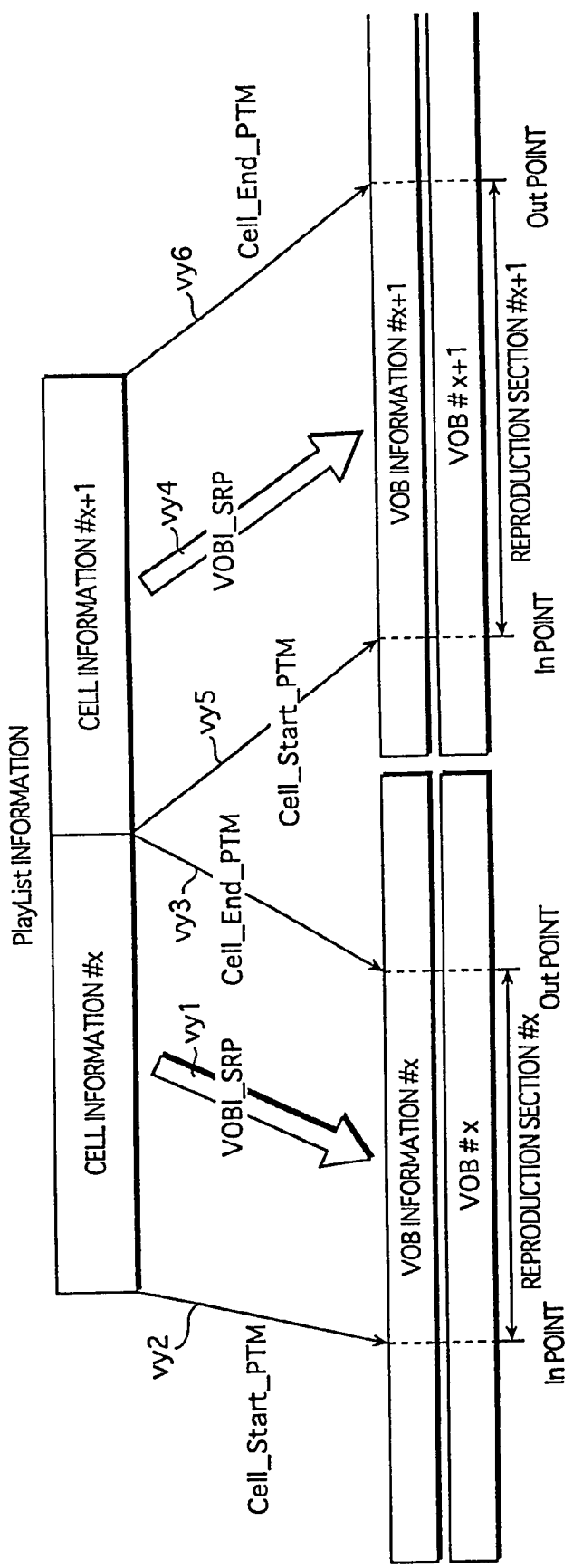
FIG. 5 is a schematic diagram showing how a reproduction section is specified by CELL information #x, #x+1.

The order of the pieces of CELL information in the Playlist information shows the order of the reproduction sections. That is, if the Playlist information includes CELL information in an order of CELL information #1, #2, #3, the corresponding reproduction sections #1, #2, and #3 are to be reproduced in the order of #1, #2, #3. FIG. 5 is a schematic diagram showing how a reproduction section is specified by the CELL information #x, #x+1. As FIG. 5 shows, reproduction sections are defined by a three layer structure; VOB-VOB information-CELL information. For example, if an assumption is made that for the CELL information #x in FIG. 5, a user sets an In point and an Out point corresponding to the reproduction section #x, and that for the CELL information #x+1, the user sets an In point and an Out point corresponding to the reproduction section #x+1. VOBI_SRP included in the CELL information #x specifies VOB#x through the VOB information #x, as the arrow vy1 shows. Cell_Start_PTM in the CELL information #x, as the arrow vy2 shows, shows the In point for the reproduction section #x. Finally, Cell_End_PTM in the CELL information #x shows the Out point for the reproduction section #x, as the arrow vy3 shows.

On the other hand, The CELL information #x+1 specifies the reproduction section #x+1. VOBI_SRP in CELL information #x+1, as the arrow xy4 shows, specifies VOB#x+1 through VOB information #x+1. Cell_Start_PTM in the CELL information #x+1 shows, as the arrow vy5 shows, the In point for the reproduction section #x+1. Cell_End_PTM in the CELL information #x+1 shows, as the arrow vy6 shows, the Out point for the reproduction section #x+1. The Playlist information is to be treated as one editing result consisting of a CELL information sequence.

The picture data specified by the CELL information includes a plurality of picture data compression-encoded according to a MPEG standard based on the between-frame correlations. This compression-encoding operation assumes that all the pieces of picture data of the VOB (VOBU) are reproduced sequentially from the beginning.

On the contrary, a sequential reproduction of more than two reproduction sections as depicted in FIG. 5 in such a way that the picture data at the end of the preceding reproduction section and the picture data at the beginning of the subsequent reproduction section are sequentially reproduced are against the assumption stated above. Therefore, it is difficult to sequentially reproduce a plurality of reproduction sections specified by Playlist information. Accordingly, interruption in the moving images occurs frequently between the preceding and subsequent reproduction sections. This means that every time the reproduction section switches from one to another, interruption occurs in the reproduced images. The editing result defined by Playlist information will be as if it were a patchwork quilt with interruptions here and there.

To have an editing result of high quality without image interruption, some modification of data is required in-between the reproduction sections. The modification techniques that make the transitions between reproduction sections smooth include a seamless connection, a fade-out connection, a fade-in connection, a cross-fade connection, and so on. FIG. 6A-FIG. 6D depicts each modification technique. Note that hereafter in this specification, the parts to be modified by the stated technology will be referred to as "end vicinity of a preceding reproduction section" and "beginning vicinity of a subsequent reproduction section" respectively. An assumption is made such that the end vicinity in FIG. 6A-FIG. 6D includes 4 pieces of picture data such as PC1-PC4, and that the beginning vicinity includes 4 pieces of picture data such as PC5-PC8.

FIG. 6A depicts a seamless connection. In FIG. 6, a seamless connection is conducted in such a way that after the last picture data PC4 is reproduced at the end vicinity of the preceding reproduction section, in one video frame, the first picture data PC5 in the beginning vicinity of the subsequent reproduction section is displayed. This modification technique reduces interruption in reproduction.

FIG. 6B depicts a fade-out connection. This is a modification technique in which the lightness is being decreased gradually during the reproduction of the picture data from PC1 to PC3, with the lowest lightness at the reproduction of the picture data PC4. Then, picture data PC5 will be displayed at the beginning vicinity of the subsequent reproduction section.

FIG. 6C shows a fade-in connection. This connection technique is conducted in such a way that after the picture data PC4 at the end vicinity of the preceding reproduction section is reproduced, the picture data PC5 at the beginning vicinity is reproduced with the lowest lightness, and then the lightness will be increased gradually during the display of picture data PC6-PC8.

FIG. 6D depicts a cross-fade connection. The picture data PC1-PC4 that belong to the end vicinity are displayed with gradually decreasing lightness just as FIG. 6B, while the picture data PC5-PC8 that belong to the beginning vicinity are displayed with gradually increasing lightness just as FIG. 6C. Specifically, several combined images are created as a result of each picture data set, such as PC1 and PC5, PC2 and PC6, PC3 and PC7, PC4 and PC8, and the combined images are displayed in such a way that at the time PC4 is displayed with the lowest lightness, the PC8 belonging to the subsequent reproduction section is displayed. The above are the descriptions of the modification techniques that make the transition between the reproduction sections look smooth in the editing results.

Note that the modification in this specification includes other modification techniques than that yielding visual effects that make the resulting transition between reproduction sections look more smooth. These other modification techniques include such techniques as computer graphics, a synthesizing of animation, adding of superimposing text, and so on, all of which are transactions that involve data operations for VOBs.

Next, how to set the end vicinity and the beginning vicinity is described.

FIG. 7A-FIG. 7B are diagrams depicting how to set the end vicinity and the beginning vicinity when the modification technique is a seamless connection.

FIG. 7A assumes that the end vicinity begins with the VOBU# (Out) which includes the Out point belonging to the preceding reproduction section inside the preceding VOB #x and ends with the VOBU which is the second VOBU ahead from the VOBU (Out), and assumes that the beginning vicinity is the VOBU which includes In point for the subsequent reproduction section among the subsequent CELL information #x+1.

The reason why the assumption is made that the end vicinity includes up to the second VOBU ahead to be encoded, is that to maintain the synchronizing reproduction between the audio data. Since picture data is compression-encoded in relation to other picture data, the picture data will not be reproduced immediately after when read from the DVD, but has to wait after the subsequent picture data is reproduced. Therefore, the picture data will be stored in a buffer inside the reproduction apparatus until it is reproduced. The maximum time period that the picture data is stored in the buffer is 1 second. On the other hand, audio data will not be stored in the buffer, or when it is, the time period is very short. Thus, the picture data stored in the GOP sometimes will be reproduced at the same time as the audio data read from a DVD 1 second later than the picture data is read out.

The audio data which is read, from the DVD, 1 second after a particular picture data is read is 1 or 2 VOBU ahead from the picture data itself. This means that the picture data included in a VOBU will be associated with a VOBU which is one or two pieces ahead of the subsequent VOBU. Due to this relationship, up to a VOBU which is two pieces ahead of the VOBU is designed to be re-encoded.

Note that the reason why the end and beginning vicinities are defined as the above is detailed in the U.S. Pat. No. 6,148,140. Please refer to this publication for the details.

Further, in a seamless connection, the required total reproduction time period for the preceding reproduction sections will be longer than a predetermined length. This is because if the reproduction time period is short, the buffer cannot store enough data while reproducing the preceding reproduction section, which causes an underflow during disk seek caused by random access to the subsequent reproduction section after the preceding reproduction section.

On the other hand, as FIG. 7A depicts, in such a modification as a fade-out connection, a fade-in connection, or a cross-fade connection, the end vicinity includes a VOBU which is jth VOBU from the VOBU including the Out point in a backward direction, and the beginning vicinity includes a kth VOBU from the VOBU including the In point in a forward direction.

Each of j and k is a number of VOBUs that have a visual effect in such a modification as a fade-in, a fade-out, and a cross-fade. Therefore, the actual number changes due to each user's sensitivities on specifically what kind of visual effect they would like to have in editing, which changes case by case.

Moreover, the length of the end vicinity is usually different from that of the beginning vicinity. However, to facilitate understanding, in this specification, the end vicinity is assumed to be only VOBU# (Out) which includes the Out point, and the beginning vicinity is only VOBU# (In) which includes the In point. This is the end of the description about the modification for VOBs. An important point to remember is that a virtual editing does not conduct modification for the original VOB in principle. Accordingly, these modification techniques cannot be directly applied to the original VOB.

From the above point, in this embodiment, the end vicinity of the preceding reproduction section and the beginning vicinity of the subsequent reproduction section, both included in a VOB, are duplicated. The duplicated part is then recorded on a DVD for modification purposes.

Figure 8:
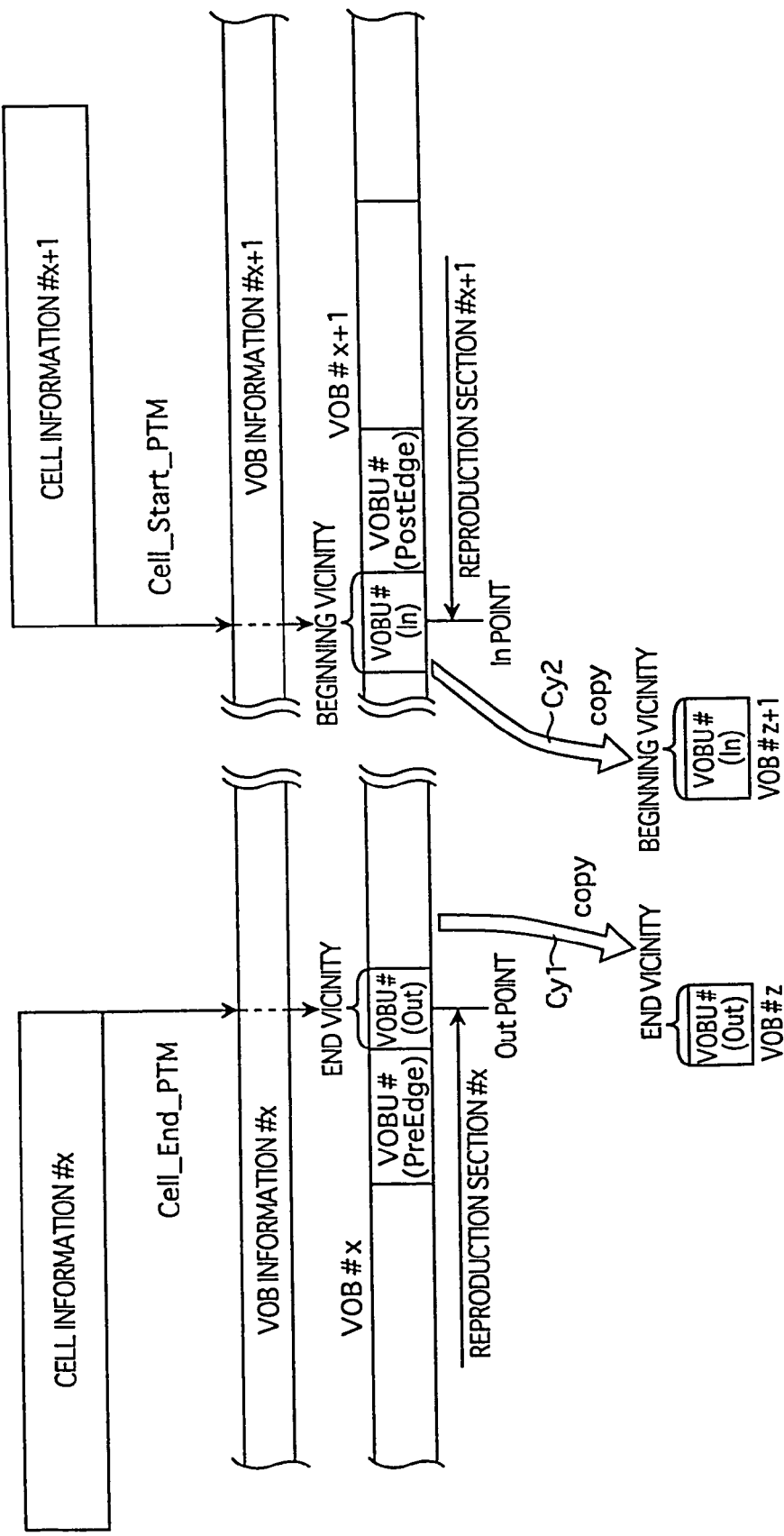
FIG. 8 is a diagram showing a duplicated part which is written for the purpose of data modification.

FIG. 8 shows a duplicated part which is written on a DVD for data modification purposes. In FIG. 8, duplication is performed according to the arrows Cy1 and Cy2. VOB#z in FIG. 8 is a duplicated part in which the end vicinity of the preceding reproduction section is duplicated (i.e. from the VOBU# (Out) including the Out point to the second VOBU from the VOBU# (Out)). VOB#z+1 is a duplicated part in which the beginning vicinity of the subsequent reproduction section is duplicated (i.e. VOBU# (In) including the In point).

Figure 9:
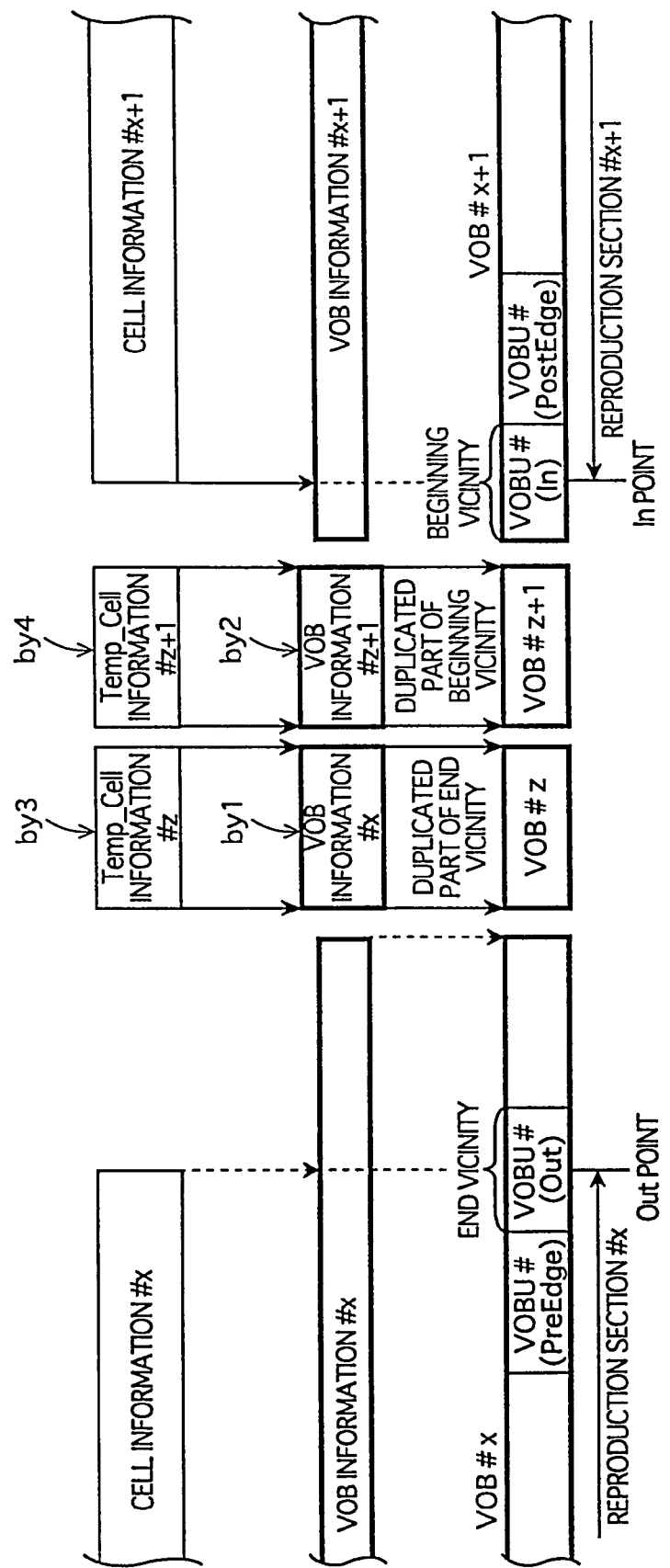
FIG. 9 is a diagram showing a DVD on which the VOB#z, #z+1, VOB information #z, #z+1, and Temp_Cell information #z, #z+1 are written.

Just as for the other VOB, for the stated VOB#z and VOB#z+1, corresponding VOB information #z, and #z+1 are set, and the reproduction section is specified by Temp_Cell information #z and Temp_Cell information #z+1. FIG. 9 shows a DVD on which VOB#z, VOB#z+1, and VOB information #z, VOB information #z+1, Temp_Cell information #z, and Temp_Cell information #z+1 are written. As the arrows by1 and by2 show, the VOB information #z and VOB information #z+1 are written, and the arrows by3 and by4 show, Temp_Cell information #z and Temp_Cell information#z+1 are written on the DVD. As the above statement suggests, the three layer structure "VOB-VOB information-CELL information" defines the reproduction section in the duplicated part. The difference between these VOB#z, #z+1 and other VOBs is that VOB#z, #z+1 are specified by a special type of cell information which is "Temp_Cell information." The Temp Cell information is CELL information which specifies the reproduction section to be reproduced, by linking, between the preceding reproduction section specified by precedent CELL information in the Playlist information and the subsequent reproduction section specified by subsequent CELL information. The VOB#z, and VOB#z+1 specified by Temp_Cell information #z and Temp_Cell information#z+1 each are the duplicated part to be modified. Therefore, by making the Temp_Cell information specify these VOB#z, and VOB#z+1, these duplicated parts to be modified will be reproduced after the reproduction of the preceding reproduction section #x, and before the reproduction of the subsequent reproduction section #x+1.

Figure 10:
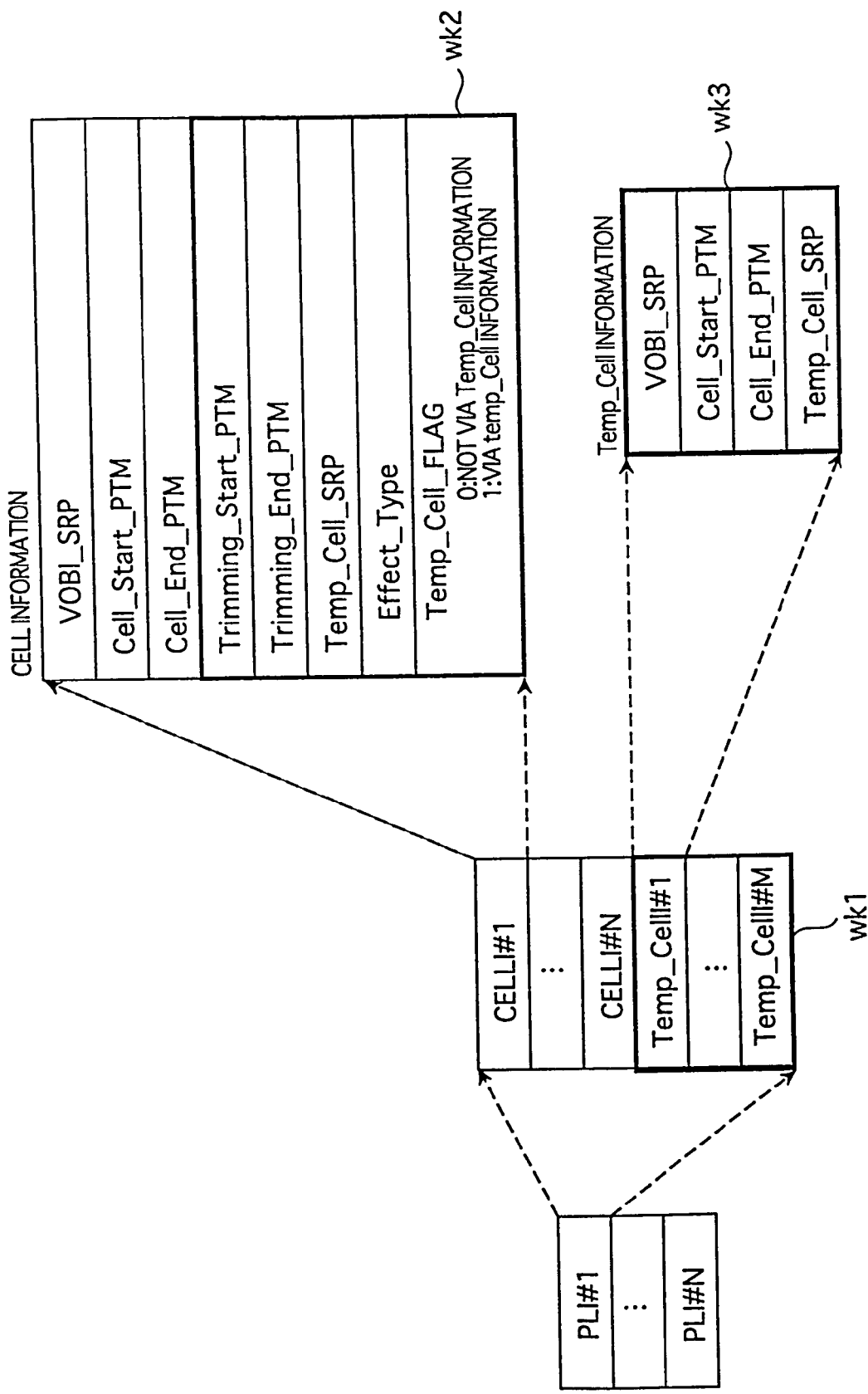
FIG. 10 is a diagram showing a data structure of CELL information of Playlist information relating to the first embodiment.
Figure 11:
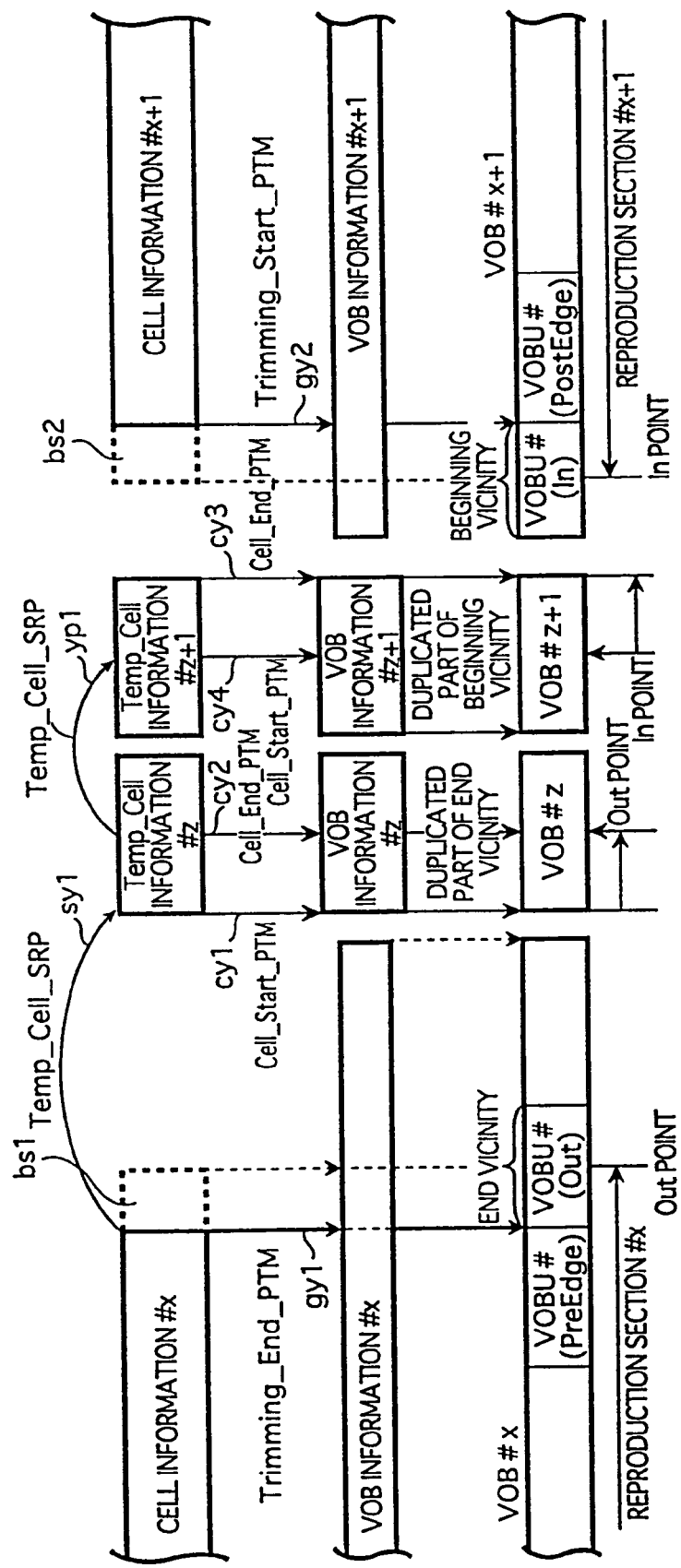
FIG. 11 is a schematic diagram showing how a VOB is specified by CELL information and Temp_Cell information that are shown by FIG. 10.

Next, the data structure of Temp_Cell information and the data structure of CELL information when Temp_Cell information is set are described with reference to FIG. 10. FIG. 10 is a diagram showing the data structure of the CELL information in the Playlist information, which relates to the first embodiment of the present invention. FIG. 11 is a schematic diagram showing how the VOB is specified by the CELL information and the Temp_Cell information shown in FIG. 10. The boxes framed with thick lines wk1, wk2, and wk3 show the differences between the internal structure of the Playlist information of FIG. 10 and the Playlist information shown in FIG. 3. The Playlist information of FIG. 10 includes the Temp_Cell information #1-#M (abbreviated as Temp_CellI in the figure) in addition to the CELL information #1-#N in FIG. 3. As wk3 shows, Temp_Cell information is comprised of VOBI_SRP which identifies the corresponding VOB, Cell_Start_PTM showing the starting point of the reproduction section of the VOB, Cell_End_PTM showing the end point of the reproduction section of the VOB, and Temp_Cell_SRP which indicates the Temp_Cell information to be subsequent to this Temp_Cell information. The Temp_Cell_SRP indicates a link to the VOB#z+1 from the VOB#z, shown as the arrow yp1 in FIG. 11.

In addition, the arrows cy1, cy2, cy3, and cy4 in FIG. 11 show how the Cell_Start_PTM and Cell_End_PTM in the Temp_Cell information are specified. The Cell_Start_PTM in the Temp_Cell information#z, as the arrow cy1 in FIG. 11 shows, specifies the picture data situated at the beginning of the VOB#z, and the Cell_End_PTM, as the arrow cy2 shows, specifies the same picture data as the Out point which is specified by a user. The Cell_End_PTM in the Temp_Cell information #z+1, as the arrow cy3 shows, specifies the picture data situated at the last part of the VOB#z+1. And the Cell_Start_PTM, as the arrow cy4 shows, specifies the same picture data as the In point which is specified by a user, for the VOB#z+1. The VOB#z and VOB#z+1 are the duplicated part for the end vicinity of the preceding reproduction section and the duplicated part of the beginning vicinity of the subsequent reproduction section respectively. Accordingly, the Cell_End_PTM of the Temp_Cell information #z specifies the same picture data as the Cell_End_PTM in the CELL information #x, and the Cell_Start_PTM of the Temp_Cell information #z+1 specifies the same picture data specified by the Cell_Start_PTM in the CELL information #x+1.

Next, the data structure of the CELL information in FIG. 10 is described. The CELL information in FIG. 10 is the same as that of FIG. 3 in that VOBI_SRP, Cell_Start_PTM, and Cell_End_PTM are specified. The difference between the CELL information in FIG. 3 is in the frame wk2, in which Trimming_Start_PTM, Trimming_End_PTM, Temp_Cell_SRP, Effect_Type, and Temp_Cell_FLAG are specified.

Temp_Cell_SRP is pointer information identifying the Temp_Cell information of the duplicated part to be reproduced. Due to the Temp_Cell_SRP, the link sy1 from the CELL information #x to the Temp_Cell information #z in FIG. 11 is clearly shown. The reason why the link relation shown by the Temp_Cell_SRP specifies a reproduction via the Temp_Cell information is to take into consideration the duplicated parts (i.e. VOB#z and VOB#z+1) being unified into one VOB or being divided into three or more pieces due to a modification. For example, when the VOB#z+1 is unified into VOB#z, the updating is performed so that the Cell_Start_PTM and the Cell_End_PTM in the Temp_Cell information #z cover the entire new VOB#z, and to delete the Temp_Cell_SRP included in the Temp_Cell information #z+1.

Further, in case that the VOB#z+1 is divided into VOB#z+1 and VOB#z+2, the Temp_Cell information #z+1 will be divided into Temp_Cell information #z+1 and Temp_Cell information #z+2. In such a case, the reproduction section for the VOB#z+1 will be specified by the Temp_Cell information #z+1, and likewise, the reproduction section for the VOB#z+2 will be specified by the Temp_Cell information #z+2. Then, the link between Temp_Cell information#z+1 and #z+2 will be specified by the Temp_Cell_SRP. This method realizes that the Temp_Cell information indicates the link relation between the duplicated parts that have a possibility of being unified or divided. Therefore, if the duplicated parts are actually unified or divided, only the Temp_Cell information, not the CELL information, has to be updated. This minimizes time and trouble in updating processes.

Trimming_Start_PTM is a time code showing the picture data situated immediately after the end of the beginning vicinity.

Trimming_End_PTM is a time code showing the picture data situated immediately before the end vicinity. The Trimming_Start_PTM and the Trimming_End_PTM helps evade the overlapping of the same content when reproducing via the Temp_Cell information. That is, the Out point and the In point that a user specifies overlap each other, since the Cell_End_PTM of the CELL information #x specifies the Out point for the end vicinity of the duplicated part, and the Cell_Start_PTM of the CELL information #x+1 specifies the In point of the beginning vicinity of the duplicated part, which means that a part from the beginning of the end vicinity to the Out point, and a part from the In point to the end of the beginning vicinity will overlap in reproduction. To deal with this problem, the embodiment is equipped with Trimming_End_PTM and Trimming_Start_PTM in order to specify the picture data situated immediately after the beginning vicinity and the picture data situated immediately before the end vicinity. In FIG. 11, Cell_End_PTM of the CELL information #x specifies the range framed by the dotted line bs1. On the other hand, Trimming_End_PTM of the CELL information #x specifies the last picture data of the VOBU# (PreEdge) situated immediately before the end vicinity, as shown by the arrow gy1. Likewise, the Cell_Start_PTM of the CELL information #x+1 specifies the range framed by the dotted line bs2. On the other hand, the Trimming_Start_PTM of the CELL information #x+1, as shown by the arrow gy2, specifies the beginning picture data of the VOBU# (PostEdge). The stated "immediately before" and "immediately after" specification is made so as to evade the overlapping in reproduction, when reproduction is performed via the Temp_Cell information.

As seen in the above, the data structure of FIG. 10 enables, in a reproduction not via the Temp_Cell information, reproduction of the entire part included in both the preceding and subsequent reproduction sections, so as to include the end vicinity and the beginning vicinity shown by bs1 and bs2 respectively, based on the Cell_End_PTM and the Cell_Start_PTM. In a reproduction via the Temp_Cell information, on the other hand, the data structure indicates reproduction immediately before the end vicinity of the preceding reproduction section and immediately after the beginning vicinity of the subsequent reproduction section, based on the Trimming_End_PTM and the Trimming_Start_PTM.

Effect_Type shows what types of visual effect is specified in modification for the VOB identified by the Temp_Cell information. Here, the visual effect types include such as a seamless connection, a fade-in connection, fade-out connection, and a cross-fade connection that are stated in the above.

Temp_Cell_FLAG, when set to be "0" (i.e. off), shows a direct reproduction according to the subsequent CELL information without referring to Temp_Cell information. And when set to be "1" (i.e. on), it instructs to refer to Temp_Cell information before referring to subsequent CELL information. Two examples in which Temp_Cell_FLAG is set to be "0" are 1) when enough free space on a DVD is not guaranteed for writing the duplicated part, and 2) even if there was enough free space for writing the duplicated part, the result of the modification such as re-encoding and so on has turned out to be poor, and a user does not want the reproduction thereof. On the contrary, an example in which Temp_Cell_FLAG is set to be "1" is that when the modification for the duplicated part has turned out to be a success, and a user would like to refer to the Temp_Cell information which specifies the modified duplicated part.

Figure 12:
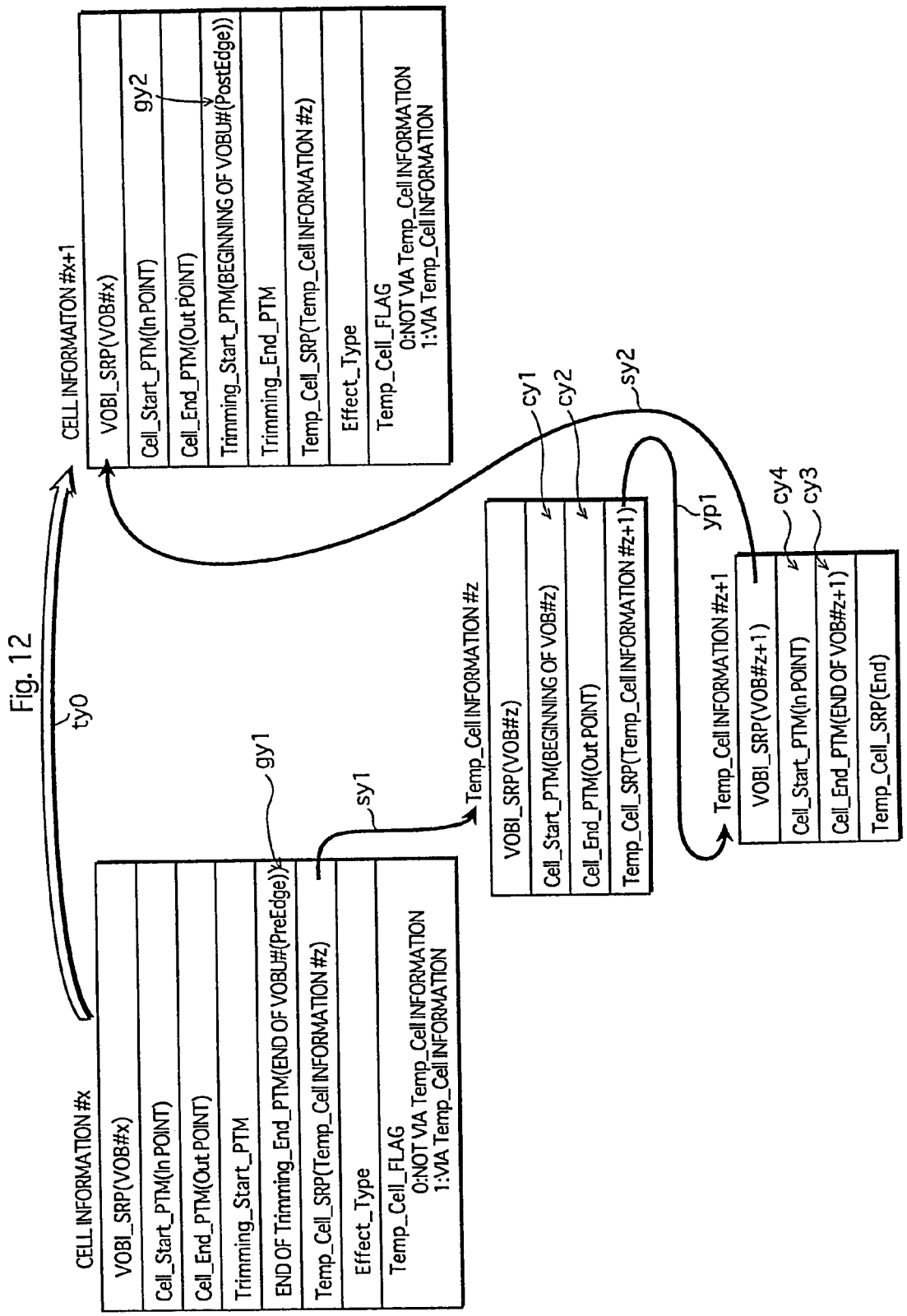
FIG. 12 is a diagram showing which part is specified by the CELL information and the Temp_Cell information that are depicted in FIG. 9.

The existence of Temp_Cell_FLAG enables the switching between reproduction via/not-via Temp_Cell information. FIG. 12 is an example in which the CELL information and the Temp_Cell information shown in FIG. 10 are specified, in accordance with the example of FIG. 9. The Temp_Cell SRP in the CELL information #x, as the arrow sy1 shows, specifies the Temp_Cell information #z, and the Temp_Cell_SRP of the Temp_Cell information #x, as the arrow yp1 shows, specifies the Temp_Cell information #z+1. Trimming_End_PTM of the CELL information #x, as the arrow gy1 shows, specifies the picture data situated at the end of the VOBU# (PreEdge), and the Trimming_Start_PTM of the CELL information #x+1 specifies the picture data situated at the begining of the VOBU# (PostEdge), respectively. The Cell_Start_PTM of the Temp_Cell information #z, as the arrow cy1 shows, shows the picture data situated at the beginning of the VOB#z, the Cell_End_PTM of the Temp_Cell information #z, as the arrow cy2 shows, shows the Out point for the VOB#z, and the Cell_Start_PTM of the VOB#z+1, as the arrow cy4 shows, shows In point of the VOB#z, and Cell_End_PTM of VOB#z+1, as the arrow cy3 shows, shows the end of the VOB#z+1, respectively. The Temp_Cell FLAG shows whether the reproduction should be performed according to the order of the arrows sy1, yp1, sy2, or the direct reproduction should be performed from the CELL information #x to the CELL information #x+1, as shown by the arrow ty0.

The above embodiment enables duplicating the end vicinity of a preceding reproduction section as well as the beginning vicinity of a subsequent reproduction section, and writing the duplicated part on a DVD for modification purposes. This enables modification techniques yielding a variety of visual effects for the duplicated part while maintaining the principle of the virtual editing. When the editing succeeded, the reproduction of the duplicated part is realized by making the temp_Cell_FLAG for the CELL information set to be on. This enables a smooth reproduction of the reproduction section sequence specified by the Playlist information, without interruption during reproduction.

Moreover, the fact that the recovery is assured when the editing failed is assured is an advantage for users who dare to try varieties of editing techniques such as fade-in, fade-out, cross-fade, and so on.

Second Embodiment

Figure 13:
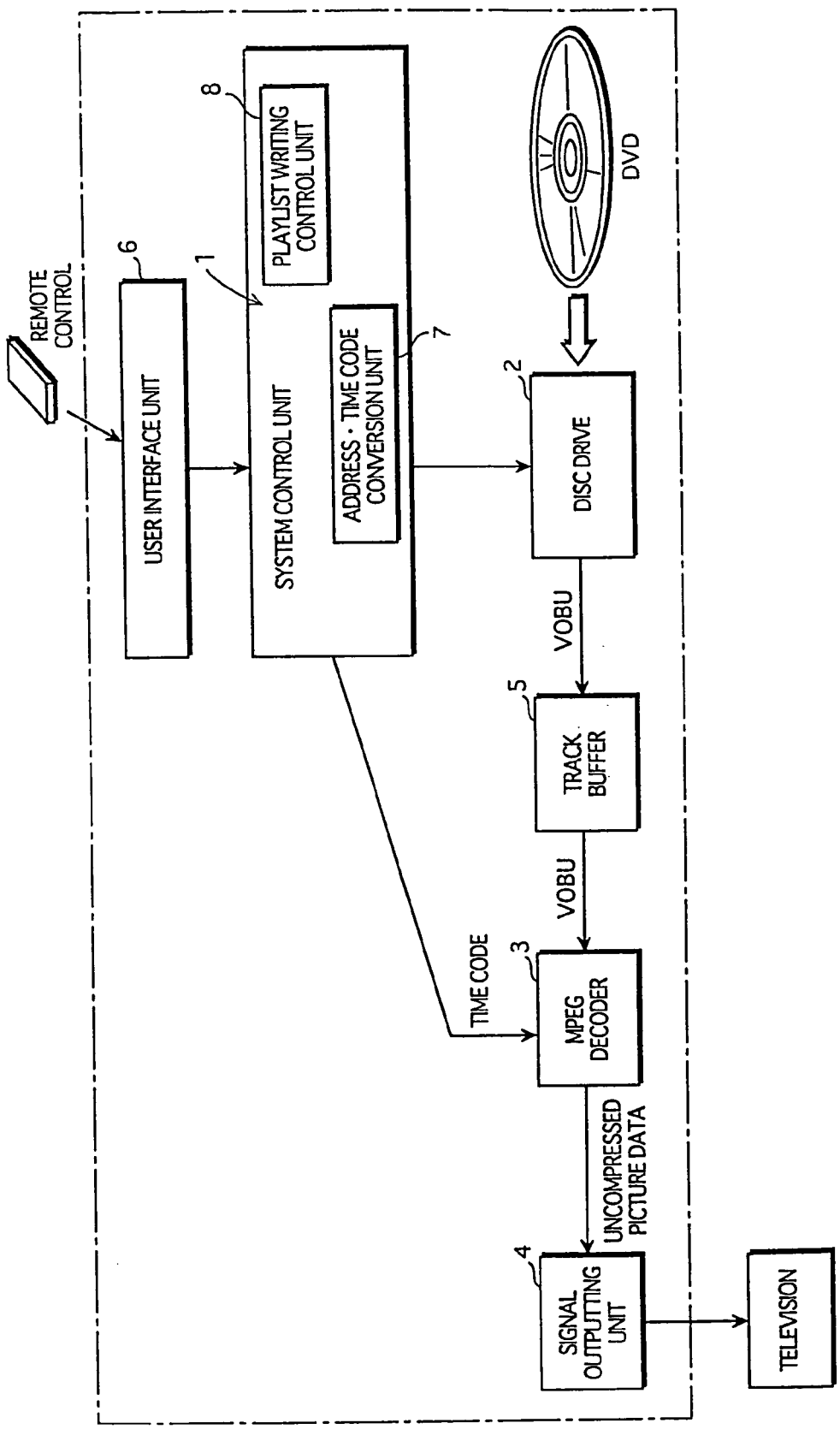
FIG. 13 is a diagram showing an internal structure of a recording apparatus.

The second embodiment of the present invention relates to a recording apparatus that records, by a virtual editing, the CELL information and the Temp_Cell information described in the first embodiment. FIG. 13 depicts an internal structure of a recording apparatus. The recording apparatus includes a system control unit 1, a disc drive 2, a MPEG decoder 3, a signal outputting unit 4, a track buffer 5, and a user interface unit 6. The system control unit 1 includes an address• time code conversion unit 7 and a playList writing control unit 8.

The system control unit 1 receives, from an operator, specification of the point (i.e. Play point) to be reproduced. Once the Play point is specified, the system control unit 1 specifies which VOBU in a VOB includes this Play point, and which picture data corresponds to the Play point, referring to the TMAPI. Then, the system control unit 1 specifies the disc drive 2 to read out the specified VOBU, and the MPEG decoder 3 to display only the picture data specified by the Play point in the read VOBU. When two Play points are specified that consist of the starting point for the reproduction section (In point), and the ending point thereof (Out point), the Playlist information including the CELL information specifying the reproduction section is written on the DVD.

The disc drive 2 is an apparatus which can load and access a DVD, which is able to read the VOBU including the picture data in reproducing the picture data and input the VOBU into the MPEG decoder 3.

The MPEG decoder 3, when the reproduction of the picture data is specified, obtains uncompressed picture data by decoding the VOBU which is read from the DVD by the disc drive 2.

The signal outputting unit 4 converts, into a video signal, the uncompressed picture data obtained by the decoding of the MPEG decoder 3, and outputs the video signal to a television and the like.

The track buffer 5 is designed to absorb the speed difference between the speed of the DVD in reading VOBUs, and the speed of the MPEG decoder 3 in decoding picture data. The sequential reproduction of more than one picture data is enabled, unless either over flow or under flow does not occur in this buffer.

Figure 14:
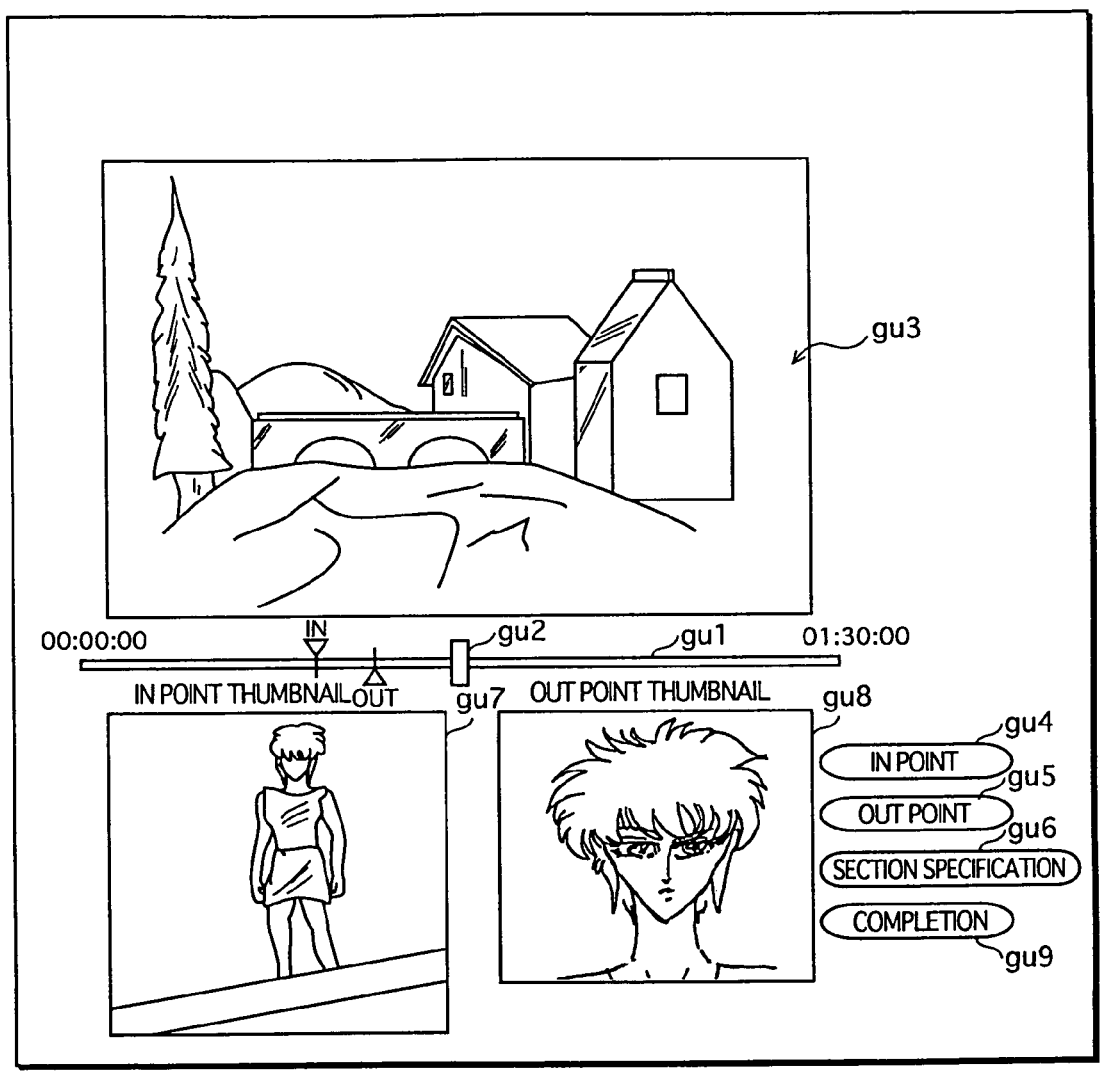
FIG. 14 is a diagram showing an example of an interactive screen used for a virtual editing.

The user interface unit 6 receives, through an interactive screen, an operation on specifying a Play point, an In point, and an Out point. FIG. 14 depicts an example of the interactive screen used for the virtual editing transaction. As FIG. 14 shows, an interactive screen includes a rail gu1, a slide bar gu2, a reproduction window gu3, an IN button gu4, an OUT button gu5, a section specifying button gu6, an In point thumbnail gu7, an Out point thumbnail gu8, and a terminating button gu9. The slide bar gu2 is designed to move along the rail gu1, according to a cursor key operation from a user. Once the position of the slide bar gu2 is specified, the system control unit 1 understands that the position of the slide bar gu2 on the rail gu1 is the Play point. For example, if the VOB is two hours long, and the slide bar gu2 is specified in the vicinity of the middle of rail gu1, then the Play point is understood to be around one hour from the beginning of the VOB.

On the reproduction window gu3, the picture data which resides on the Play point is displayed. The IN button gu4 and the OUT button gu5 are to receive an operation to set an In point and an Out point respectively. And the section specifying button gu6 is to receive an operation to execute the specification of a reproduction section. The In point thumbnail gu7 and the Out point thumbnail gu8 are windows for displaying the thumbnail for the picture data specified by the In point and the Out point. The terminating button gu9 is a button for receiving the terminating operation for the virtual editing.

Figure 15:
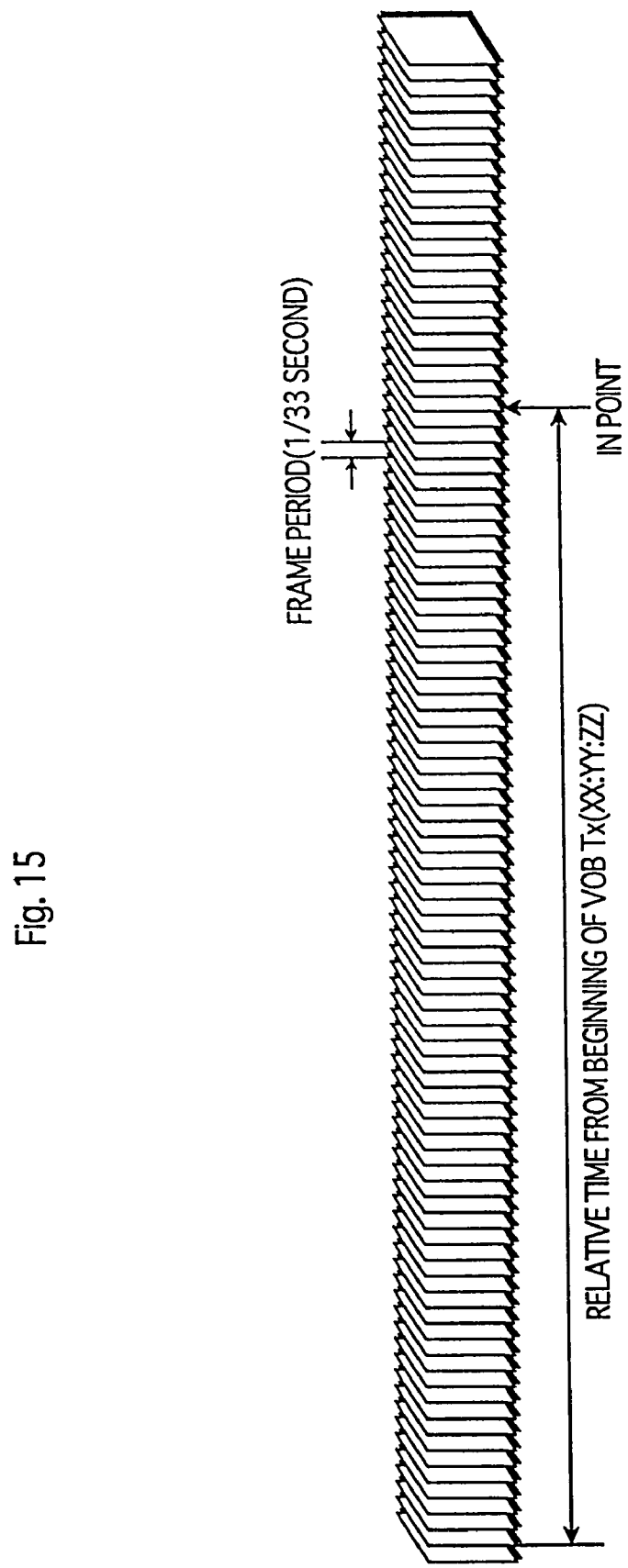
FIG. 15 is a diagram showing a process in which an address• time code conversion unit 7 specifies the address of a VOBU from a time code.
Figure 16:
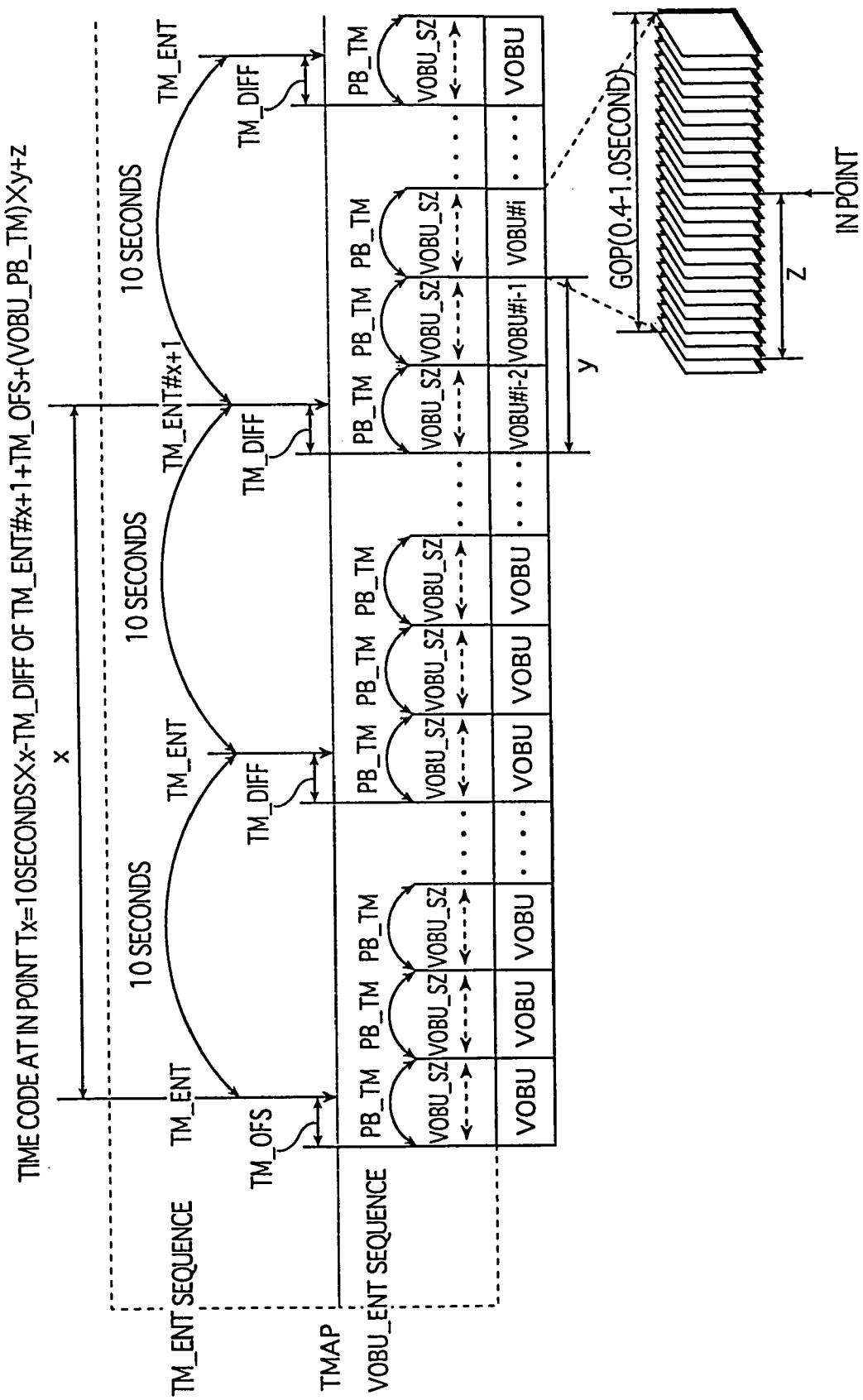
FIG. 16 is a diagram showing a process in which an address• time code conversion unit 7 specifies the address of a VOBU from a time code.
Figure 17:
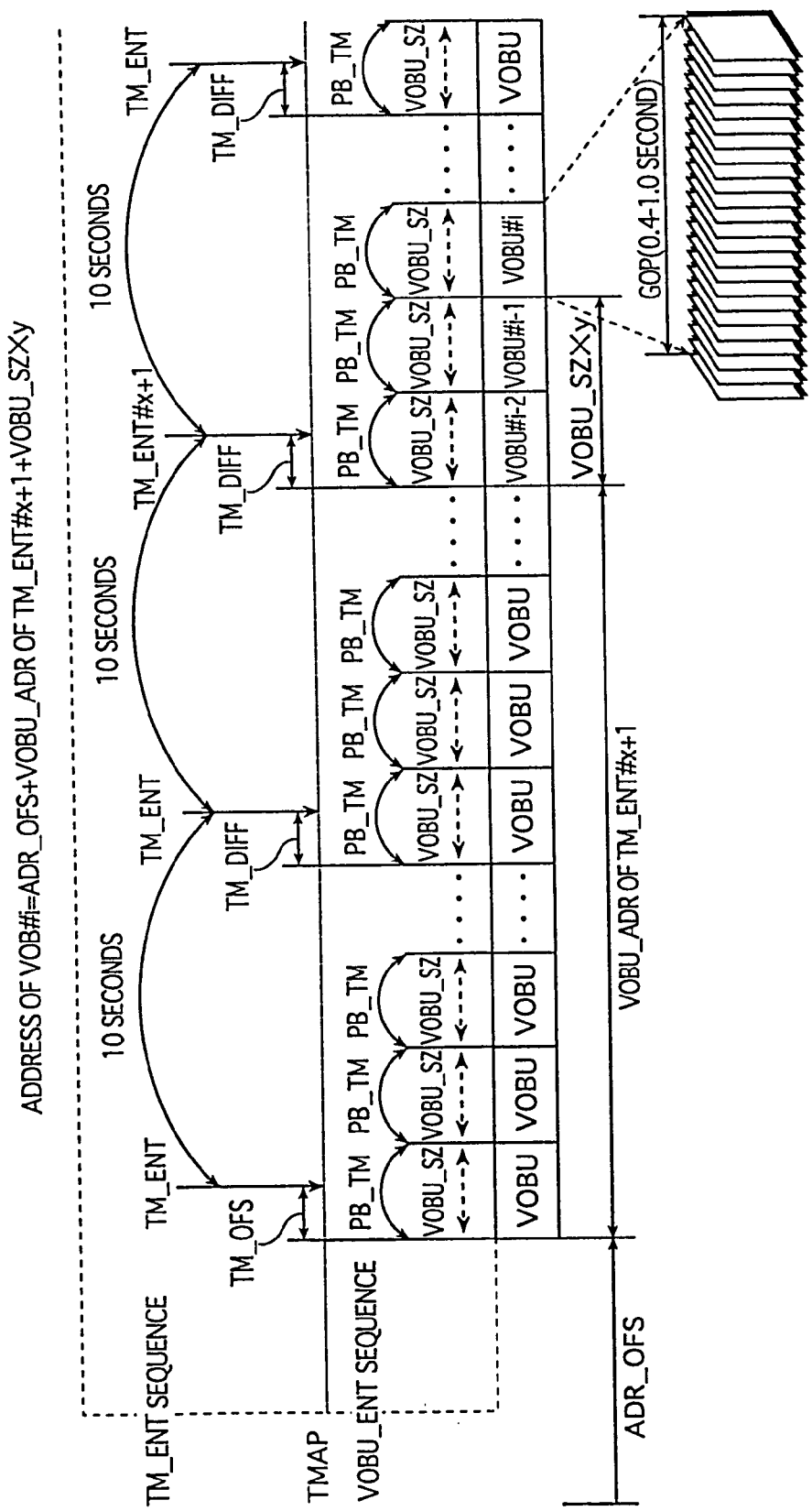
FIG. 17 is a diagram showing a process in which an address• time code conversion unit 7 specifies the address of a VOBU from a time code.

The address• time code conversion unit 7 specifies, according to the time code, addresses of VOBUs inside the AV file. The time code specifies a Play point, and In/Out points for a reproduction section. The address• time code conversion unit 7, when the time code has set by a user, identifies which VOBU includes the time code, and which picture data in the VOBU corresponds to the time code, with reference to the TMAPI. FIG. 15-FIG. 17 are diagrams showing the process performed by the address• time code conversion unit 7 for specifying the address of the VOBU according to the time code. Hereafter, the process will be described based on an example of the In point. As FIG. 15 shows, when an In point is specified by the relative time Tx from the beginning of a VOB, x, y, and z are obtained that satisfy the following expression 1. And by substituting the obtained x and y into the following expression 2, the address of the VOBU#I is obtained (FIG. 17). From the obtained address, VOBU is read out from a DVD. And if the system control unit 1 indicates the reproduction of the picture data which appears when the time period z passes from the reproduction starting time of the VOBU, the picture data will be displayed which corresponds to the In point.

IN point time code $Tx=10 \sec \times x - TM\_DIFF + TM\_OFS$ of $TM\_ENT\#x+1 + (VOBU\_PB\_TM) \times y + z$     (expression 1)

address of $VOBU\#i = ADR\_OFS + VOBU\_ADR + VOBU\_SZ$ of $TM\_ENT\#x+1 \times y$     (expression 2)

Figure 18:
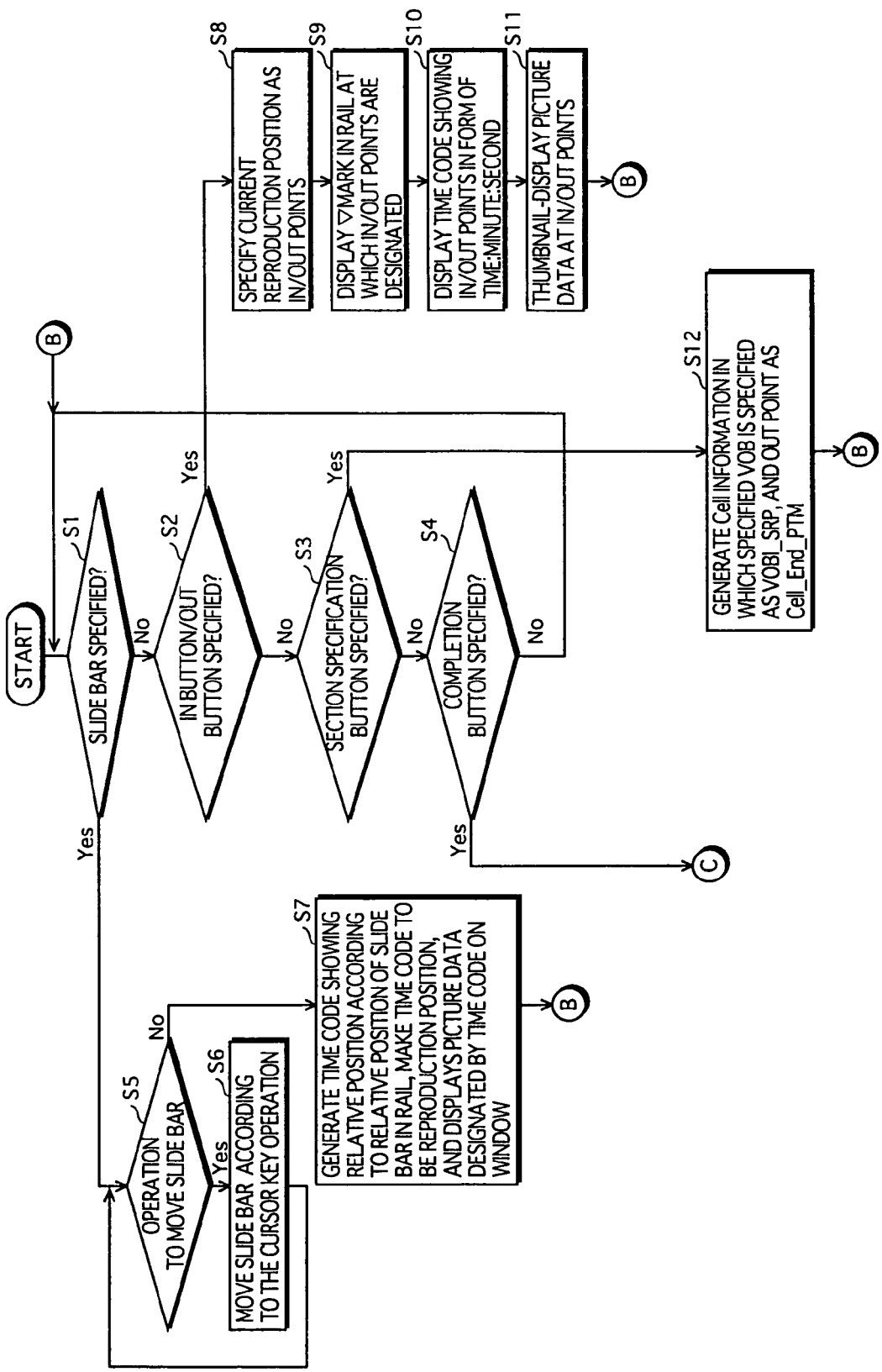
FIG. 18 is a flow chart showing a transactional procedure for the Playlist writing control unit 8.

The Playlist writing control unit 8 writes Playlist information to the DVD, based on the interactive operation from a user. Specifically the Playlist writing control unit 8 is a program realizing the transaction procedure depicted in FIG. 18 and FIG. 19. Hereafter, the transaction procedure that the Playlist writing control unit 8 performs is described, with reference to FIG. 18 and FIG. 19. When the recording apparatus is started up, the control begins by the loop transaction between the step S1 and the Step S4. This loop transaction is repeated until the slide bar gu2, the IN button gu4, the OUT button gu5, the section specifying button gu6, and the transaction terminating button gu9 are specified. When the slide bar gu2 is specified, the control moves from the step S to the step S5, and waits until an operation to move the slide bar gu2 is performed. When the operation to move the slide bar gu2 is performed, the slide bar gu2 is moved at Step S6 according to the moving operation. Hereafter, while the moving operation by the user to move the slide bar gu2 continues, the steps S5-S6 move the slide bar gu2 either to the left or right direction. When the moving operation for the slide bar gu2 is stopped (Step S5:No), the control moves to the step S7, and based on the relative position of the slide bar gu2 assuming that the most left point of the rail gu1 is the base point, generates a time code, and specifies the time code as a Play point. Here, if the Cell to be edited is assumed to have 1.5 hour-length, the most left point of the rail gu1 will be 00 (hour):00 (minute):00.00 (second), and the most right point of the rail gu1 will be 01 (hour):30 (minute):00.00 (second). Based on the stated assumption, the point of the slide bar gu2 in the rail gu1 will be represented as time, (i.e. hour:minute: second). Here, if the assumption is made that the slide bar gu2 exists in the middle of the rail gu1, then the time representation will be 00:45:00.00, which will be the Play point.

Then, the picture data specified by the time code is displayed on the reproduction window gu3. from this operation, a Play point in the reproduction section will be specified, due to the moving operation of the slide bar gu2. Then, the control moves to the loop transaction consisting of the step S1-Step S4. In case that the moving operation against the slide bar gu2 does not specify the desired Play point, the user, at Step S1, specifies again the slide bar gu2, and fine-tunes the position of the Play point by repeating the moving operation at Steps S5-S6.

Here, an assumption is made that, after the fine-tuning, the desirable Play point for the operator is set, and that the IN button gu4 is pushed. In such a case, the Playpoint is specified as the In point at Step S8, and at Step S9, ∇ mark is displayed at the position specified as the In point. At Step S10, the time code showing the In point is displayed in the form of hour: minute:second. At Step S11, the thumbnail for the picture data at the In point is displayed at the In point thumbnail gu7. Through the above process, the In point will be set. After the setting of the In point, the slide bar gu2 is specified, and the operation for moving this slide bar gu2 is repeated in order to specifie the OUT setting button. And finally, through the same procedure as the In point, the Out point will be specified.

When the above procedure to set the In point and the Out point have been completed, the reproduction section is set too. Then, the control moves to the loop transaction of the steps S1-S4. Here, the assumption is made that the section specifying button gu6 is specified. After the section specifying button gu6 is specified (Step S3:yes), the control moves to the step S12. At Step S12, the VOB to be edited is set to be VOBI_SRP, and the In point to be Cell_Start_PTM, and generate Cell information in which the Out point is set to be Cell_End_PTM. The above transaction depicted in FIG. 18 will be repeated until n pieces of CELL information are generated. Then, the transaction in FIG. 18 will be complete with the pushing of the transaction terminating button gu9, and the control moves to the transaction depicted in FIG. 19.

Figure 19:
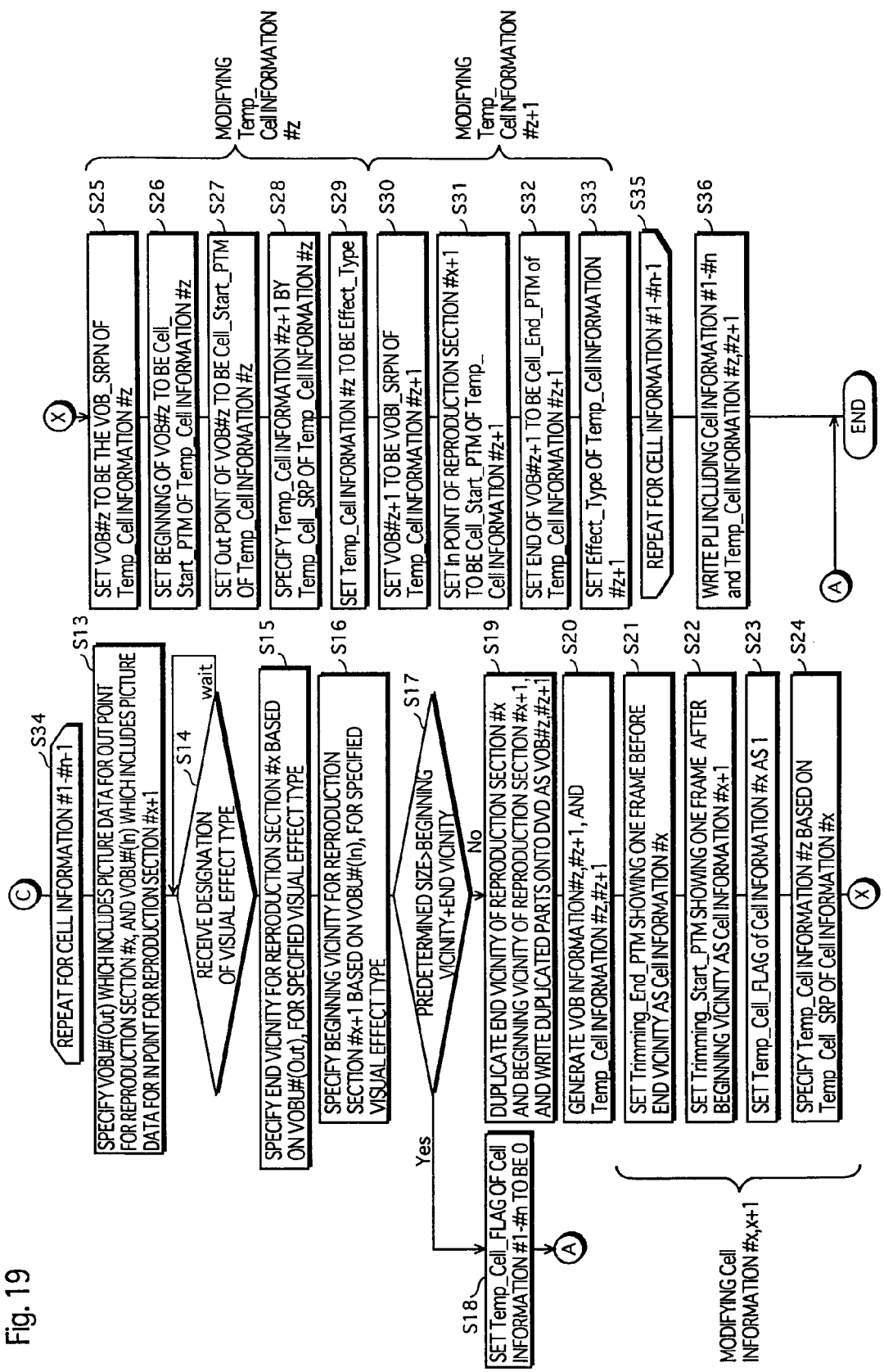
FIG. 19 is a flow chart showing a transactional procedure for the Playlist writing control unit 8.

The flow chart in FIG. 19 is a loop structure in which the steps S13-S33 are repeated for the CELL information #1-#n−1 (Step S34, Step S35). In this flow chart, the assumption is made that the CELL information which is to be modified is CELL information #x, and the subsequent CELL information in the Playlist information is CELL information #x+1. At Step S13, VOBU# (Out) is specified which includes the picture data at the Outpoint of the reproduction section #x, likewise, the VOBU# (In) is specified including the picture data at the In point for the reproduction section #x+1. At Step S14, the specification of the visual effect type is received, and at Step S15, the end vicinity of the reproduction section #x is defined based on the VOBU# (Out) according to the visual effect type. At Step S16, the beginning vicinity for the reproduction section #x+1 is specified based on the VOBU# (In). The reason why end and beginning vicinities are defined based on the visual effect type, is that in many cases the part to be modified differs for each visual effect mode. Specifically, for the visual effects such as the fade-in connection, the fade-out connection, and the cross-fade connection, it is a better solution to make users specifie the range to be modified by users' interactive operations, rather than to provide an automatic setting of the range to be modified. Once the end and beginning vicinities are specified, at Step S17, it is judged whether the sum of the size of the beginning and end vicinities exceeds the predetermined size of the DVD. This is because the virtual editing according to the present embodiment involves the recording of the duplicated part, which inherently requires that, in case that there is scarce free space in a DVD, it should be evaded that the DVD becomes full. A desirable criteria for deciding the predetermined size of the DVD is, for example, the value obtained from subtracting the data size corresponding to 5-10 VOBU from free space of a DVD. If judged to be Yes at Step S17, the transaction corresponding to this flow chart will be complete, by setting "0" for the Temp_Cell_FLAG of the Cell information #1-#n.

If judged No at Step S17, duplication is performed for the end vicinity of the reproduction section #x and the beginning vicinity of the reproduction section #x+1. Then, the duplicated parts will be written on the DVD as VOB #z and #z+1. Then, at Step S20, VOB information #z, #z+1, and Temp_Cell information #z, #z+1 are generated and written on the DVD. The transactions up to the step S20 are the same as depicted in FIG. 9 which relates to the first embodiment.

At Steps S21-S24, the setting relating to the CELL information is performed. At Step S21, the Trimming_End_PTM which specifies the picture data which is 1 video frame before the end vicinity is set to be the Cell information #x, and at Step S22, the Trimming_Start_PTM which specifies the picture data which is one video frame after the beginning vicinity is set to be the Cell information #x+1. According to the stated steps, the Trimming_End_PTM specifies the picture data situated at the end of the VOBU# (PreEdge), as the arrow gy1 in FIG. 11 shows. Likewise, as the arrow gy2 shows, the Trimming_Start_PTM specifies the picture data at the beginning of the VOBU# (PostEdge). At Step S23, the Temp_Cell_FLAG of the Cell information #x is set to be "1". At Step S24, the Temp_Cell information #z is specified by the Temp_Cell_SRP of the CELL information #x. This generates the link shown by the arrow sy1 in FIG. 11. From the above transaction, the CELL information depicted in FIG. 9 is to be obtained in a DVD.

In the following steps S25-S29, the transaction for the Temp_Cell information #z is performed. That is, at Step S25, The VOBI_SRPN of the Temp_Cell information #z is set to be VOB #z, and at Steps 26, the Cell_Start_PTM of the Temp_Cell information #z is set to be the picture data at the beginning of the VOB#z. At Step S27, the Cell_End_PTM of the Temp_Cell information #z is set to be the Out point for the reproduction section #x. The stated transaction yields a reference relation from the Temp_Cell information #z to the VOB#z, which is shown by the arrows cy1 and cy2 in FIG. 11. At Step S28, the Temp_Cell information #z+1 is specified by the Temp_Cell_SRP of the Temp_Cell information #z. The stated transaction yields a link from the Temp_Cell information #z to the Temp_Cell information #z+1, as shown by the arrow yp1. Then, at Step S29, Effect_Type for the Temp_Cell information #z is defined.

In the following steps S30-S33, the transactions for the Temp_Cell information #z+1 are performed. At Step S30, VOBI_SRPN of the Temp_Cell information #z+1 is set to be VOB #z+1. At Step S31, the Cell_Start_PTM of the Temp_Cell information #z+1 is set to be the In point for the reproduction section #x+1. At Step S32, the Cell_End_PTM of the Temp_Cell information #z+1 is set to be the end of the VOB#z+1. These transactions yields the reference relation from the Temp_Cell information #z+1 to the VOB#z+1, as shown by the arrow cy3 and cy4 in FIG. 11. Then, at Step S33, Effect_Type for the Temp_Cell information #z is set.

According to the above described embodiment of the present invention, the DVD shown by the first embodiment is obtained under a user-friendly operation environment, which increases the opportunity of using the DVD shown in the first embodiment.

Third Embodiment

Figure 20:
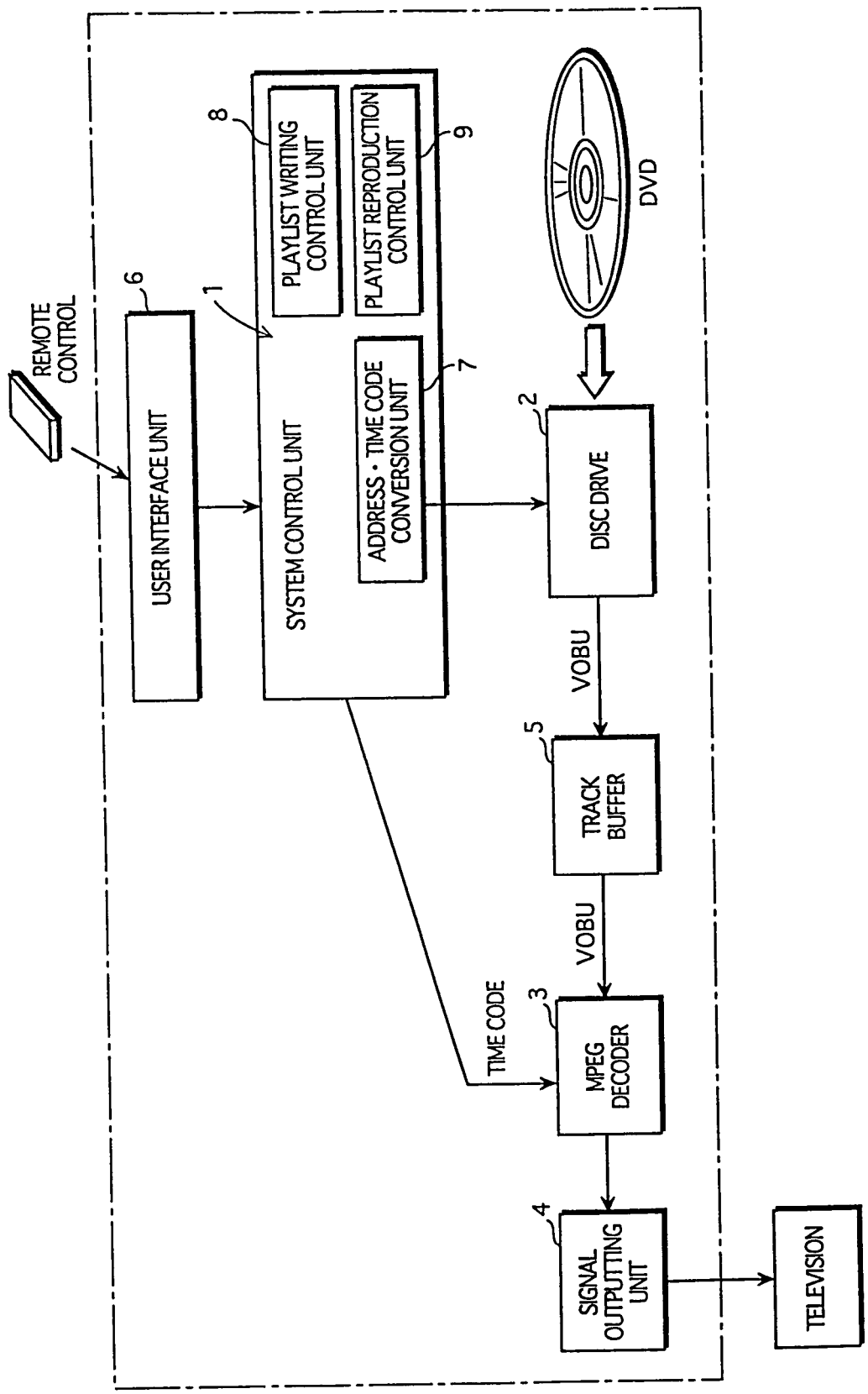
FIG. 20 is a diagram showing an internal structure of a reproduction apparatus relating to the third embodiment.

The third embodiment of the present invention relates to a reproduction apparatus for the DVD which stores the CELL information and the Temp_Cell information according to the data structure stated in the first embodiment of the present invention. FIG. 20 is a diagram showing the internal structure of the reproduction apparatus relating to the third embodiment. As FIG. 20 shows, the reproduction apparatus of the third embodiment is based on the internal structure of the recording apparatus of the second embodiment. Accordingly the same constituting elements will be assigned the same reference number, and the description thereof will be omitted. The only difference is that, in the third embodiment, the Playlist reproduction control unit 9 is added inside the system control unit 1.

In addition, the MPEG decoder 3 relating to the third embodiment, performs a trimming transaction for the reproduction purpose based on the Playlist information. The trimming transaction is a limiting action for the reproduction range. The trimming transaction starts with the reception of the specification of an In point and an Out point for a reproduction section from the Playlist reproduction control unit 9, and then outputs the uncompressed picture data which only belongs to the range from the In point and the Out point, without outputting the uncompressed picture data for the images belonging to the out of the range.

Figure 21:
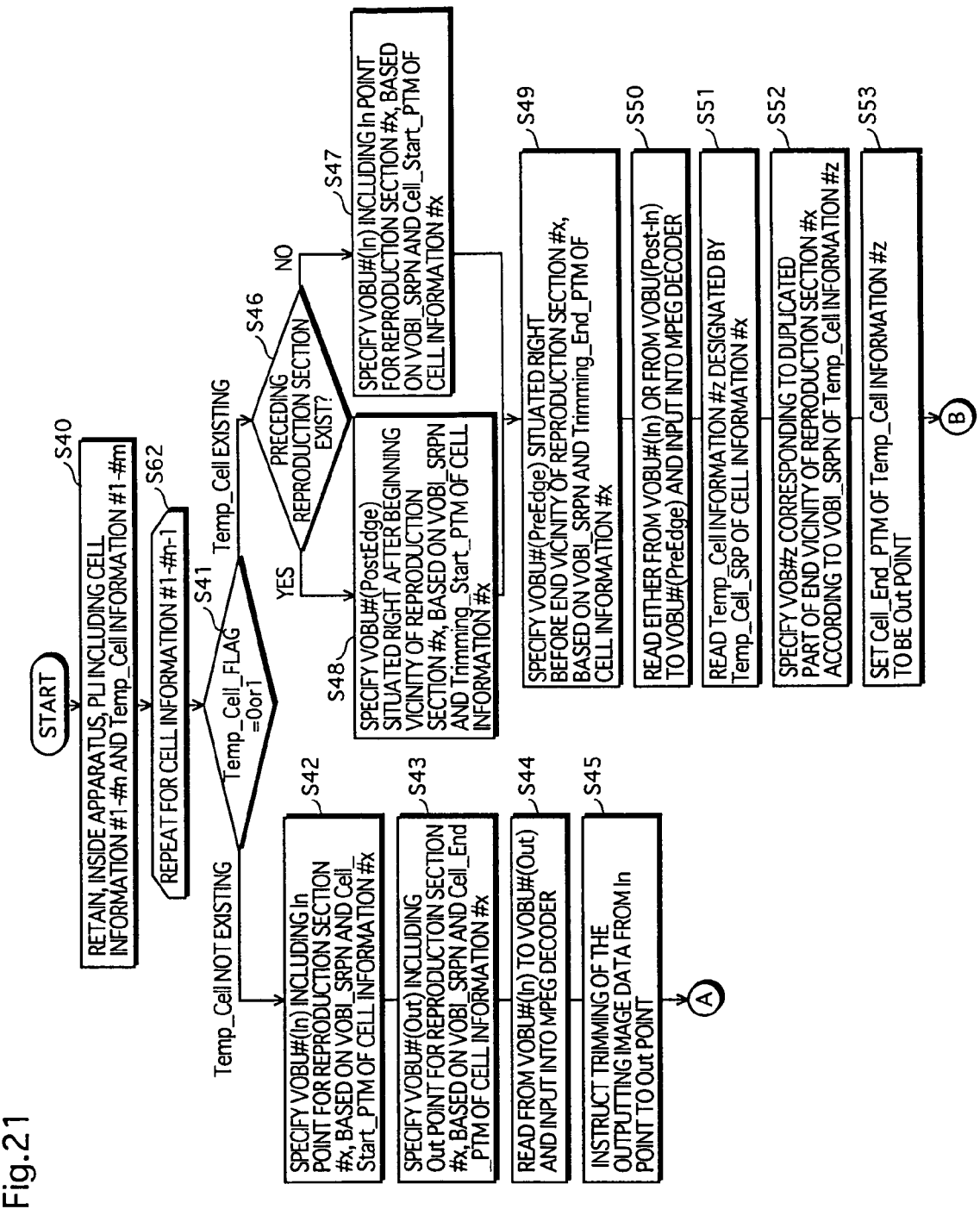
FIG. 21 is a flow chart showing a transactional procedure for the Playlist reproduction control unit 9.
Figure 22:
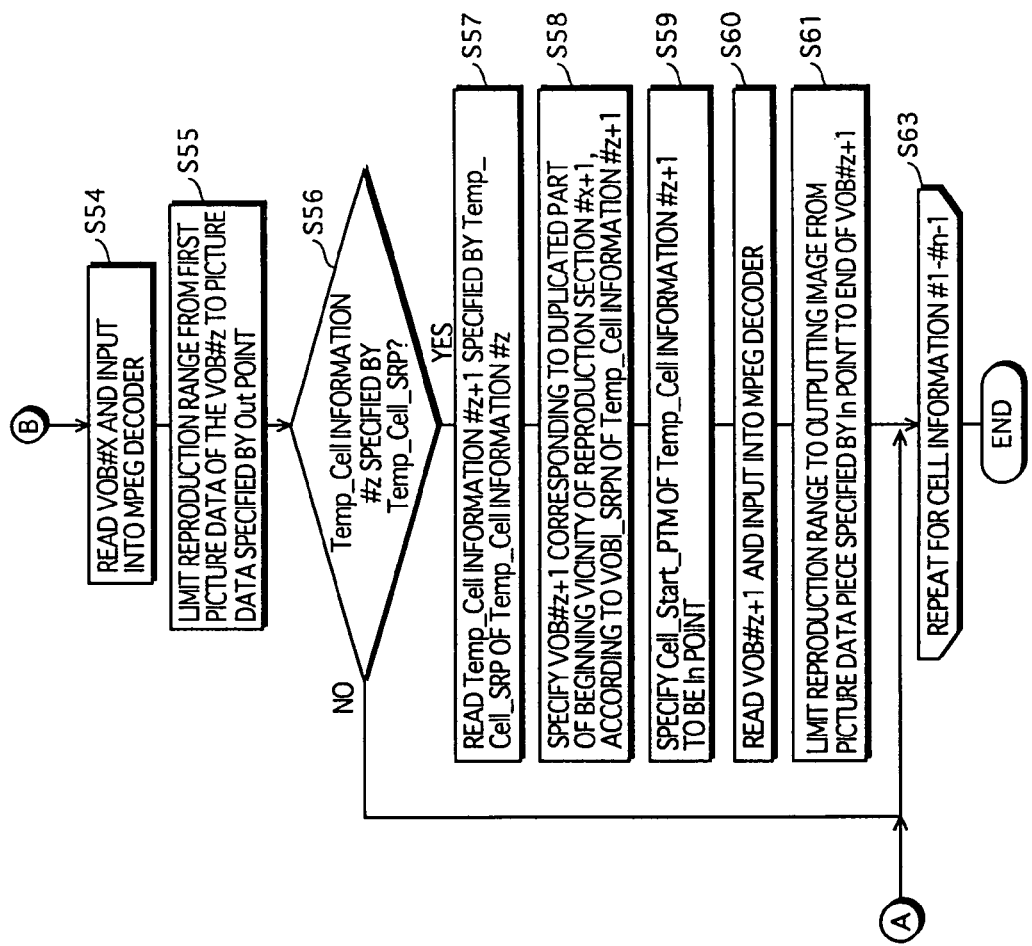
FIG. 22 is a flow chart showing a transactional procedure for the Playlist reproduction control unit 9.

The Playlist reproduction control unit 9 which is a new addition to the third embodiment is a constituting element for controlling the reproduction based on the Playlist information recorded on an optical disc. Specifically the Playlist reproduction control unit 9 is a program which realizes transaction procedure depicted in FIG. 21 and FIG. 22. The transaction procedure performed by the Playlist reproduction control unit 9 is described with reference to the flow chart in FIG. 21 and FIG. 22. In the flow chart, at Step S40, PLI including the CELL information #1-#n, and the Temp_Cell information #1-#m is read from a DVD and retained inside the apparatus. Then, the steps S41-S61 will be repeated for the CELL information #1-#n−1 (Step S62, S63). In the repetition of transactions, assumptions are made that the CELL information to be modified is called CELL information #x, and that the subsequent CELL information is called CELL information #x+1. At Step S41, it is judged whether the Temp_Cell_FLAG is "0" or not. If it is judged to be "0", at Step S42, the VOBU# (In) is specified which includes the In point in the reproduction section #x, based on the VOBI_SRPN and Cell_Start_PTM of the CELL information #x. Then, at Step S43, the VOBU# (Out) including the Out point in the reproduction section #x is specified, based on the VOBI SRPN and the Cell End PTM of the CELL information #x.

Figure 23:
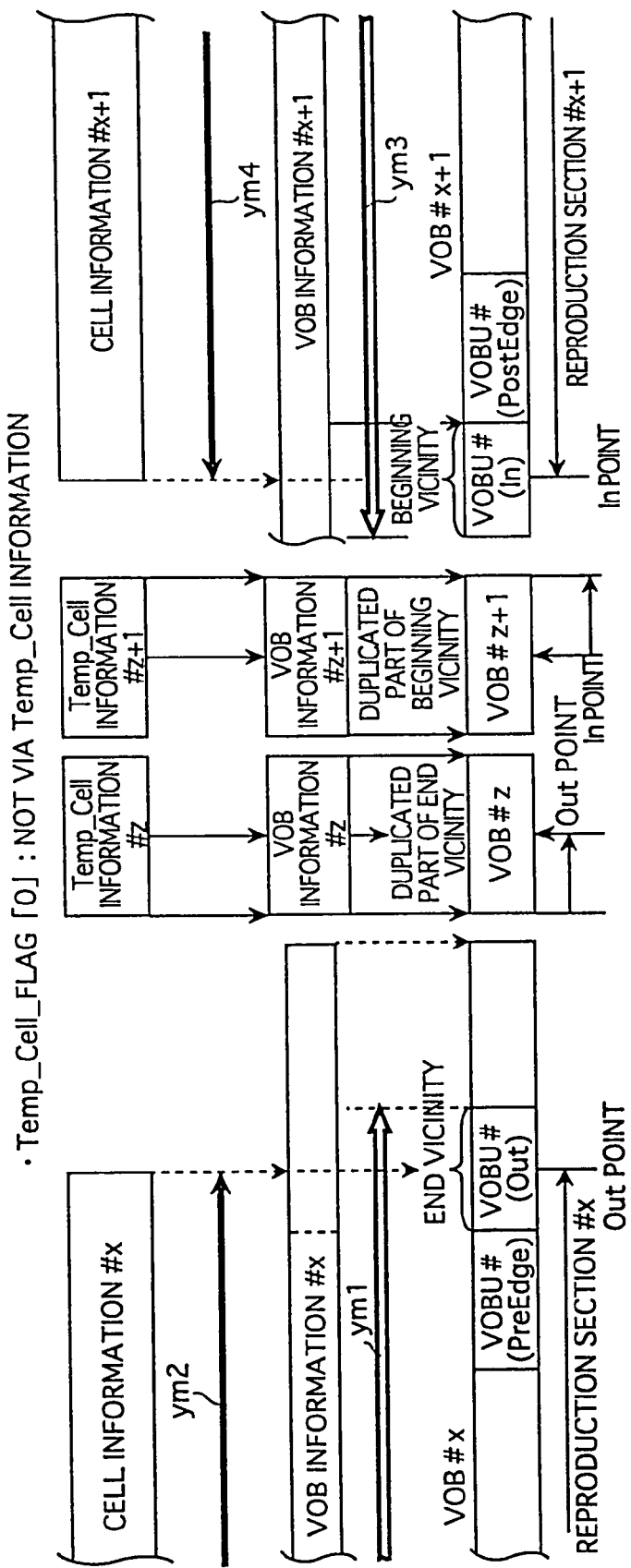
FIG. 23 is a diagram showing a reading range specified at Step S44 and a reproducing range specified at Step S45.

At Step S44, the VOBU# (In) through the VOBU# (Out) are read out and inputted into the MPEG decoder 3. At Step S45, the trimming transaction of the outputting image from the In point to the Out point is instructed to the MPEG decoder 3. FIG. 23 is a diagram showing the reading range specified at Step S44 and the reproduction range specified at Step S45. In FIG. 23, the reading range ym1 specifies up to the end of the end vicinity, while the reproduction range ym2 specifies up to the Out point in the reading range ym1. Likewise, the reading range ym3 in FIG. 23 specifies the reading from the beginning of the beginning vicinity, and the reproducing range ym4 specifies In point and after in the reading range ym3.

On the other hand, when it is judged that the Temp_Cell_FLAG is "1", at Step S46, it is judged whether a preceding reproduction section exists or not. If a preceding reproduction section does not exist, at Step S47, the VOBU# (In) including the In point in the reproduction section #x is specified, based on the VOBI_SRPN and the Cell_Start_PTM of the CELL information #x. On the contrary, when a preceding reproduction section exists, at Step S48, the VOBU# (PostEdge) situated immediately after the beginning vicinity in the reproduction section #x+1 is specified, based on the VOBI_SRPN and the Trimming_Start_PTM of the CELL information.

After the specification, at Step S49, the VOBU# (PreEdge) is specified which is situated immediately before the end vicinity in the reproduction section #x, based on the VOBI SRPN and the Trimming_End_PTM of the CELL information.

Figure 24:
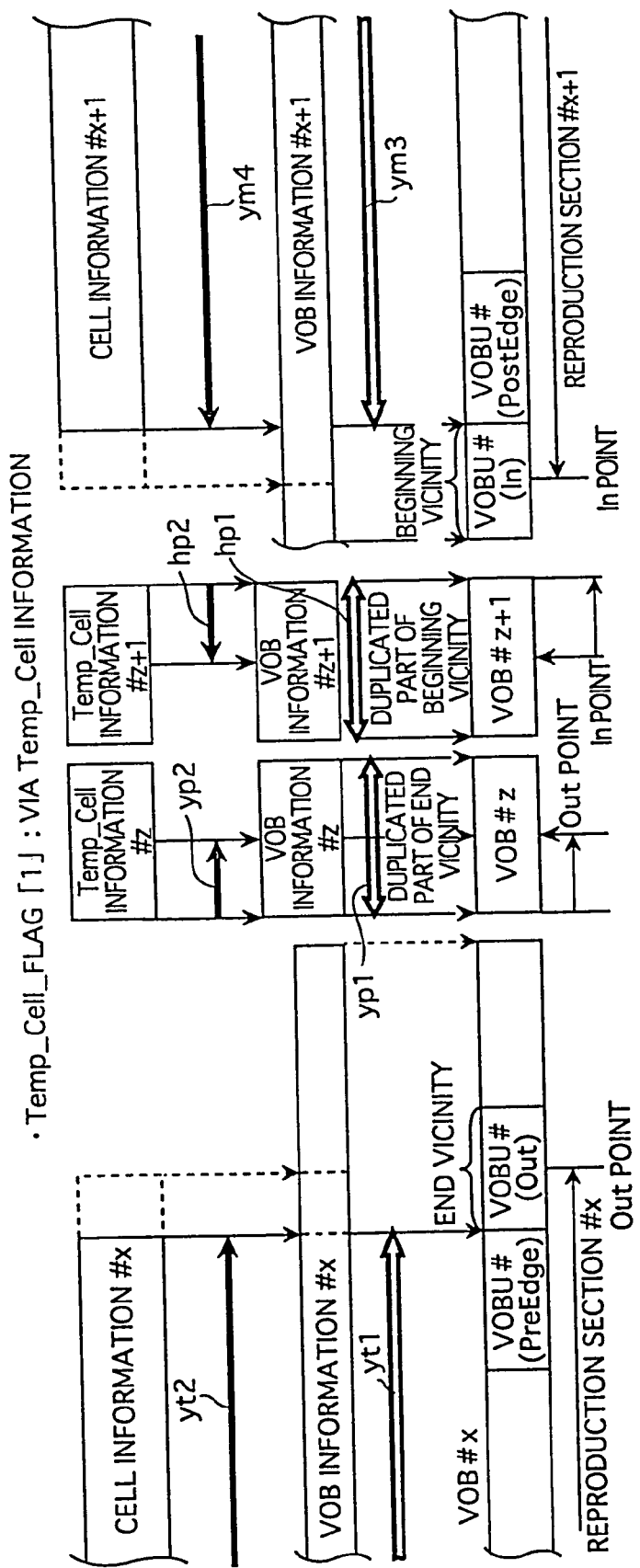
FIG. 24 is a diagram showing a reading range specified at Step S50 and a reproducing range specified at Step S50.

At Step S50, either from VOBU# (In) or from VOBU# (PostEdge) to the VOBU# (PreEdge) is read out, and inputted into the MPEG decoder 3. FIG. 24 shows the reading range specified at Step S50 and the reproduction range specified at Step S50. As is clear, The reading range yt1 and the reproduction range yt2 in FIG. 24 specifies up to the end of the VOBU# (PreEdge).

Next, at Step S51, the Temp_Cell information #z specified by the Temp_Cell_SRP of the CELL information #x is read out, and at Step S52, the VOB#z corresponding to the duplicated part of the end vicinity in the reproduction section #x is specified, according to the VOB information_SRPN of the Temp_Cell information #z. At Step S53, the Cell_End_PTM of the Temp_Cell information #z is set to be the Out point, and at Step S54, the VOB#z is read out and inputted into the MPEG decoder 3. Then, at Step S55, an instruction for trimming from the picture data at the beginning of the VOB#z and the picture data specified by the Out point is provided. The arrow yp1 in FIG. 24 shows the reading range specified at Step S54, and the arrow yp2 shows the reproduction range specified at Step S55. The reading range yp1 specifies the entire VOB#z, while the reproduction range yp2 specifies the reading range yp1 up to the Out point. From this operation, the image output is limited up to the Out point in the CELL information.

At Step S56, it is judged whether the specification by the Temp_Cell SRP of the Temp_Cell information #z exists or not. If it is judged to exist, at Step S57, the Temp_Cell information #z+1 specified by the Temp_Cell_SRP of the Temp_Cell information #z is read out, and at Step S58, the VOB#z+1 corresponding to the duplicated part of the beginning vicinity in the reproduction section #x+1 is specified, according to the VOBI_SRPN of the Temp_Cell information #z+1. At Step S59, the Cell_Start_PTM of the Temp_Cell information #z+1 is specified as the In point, and at Step S60, the VOB#z+1 is read out and inputted into the MPEG decoder 3. At Step S61, an instruction for trimming from the picture data specified by the In point to the end of the VOB#z+1 is provided. The arrow hp1 in FIG. 24 shows the reading range specified at Step S60, and the arrow hp2 shows the reproduction range specified at the step S61. The reading range hp1 specifies the entire VOB#z+1, while the reproduction range hp2 specifies the reading range hp1 from the In point up to the end. From this transaction, the image output is limited after the In point in the subsequent reproduction section.

According to the present embodiment, existing reproduction apparatuses can perform reproduction according to Temp_Cell_FLAG of Cell information, which increases the opportunity of utilizing the DVD of the first embodiment.

Fourth Embodiment

Figure 25:
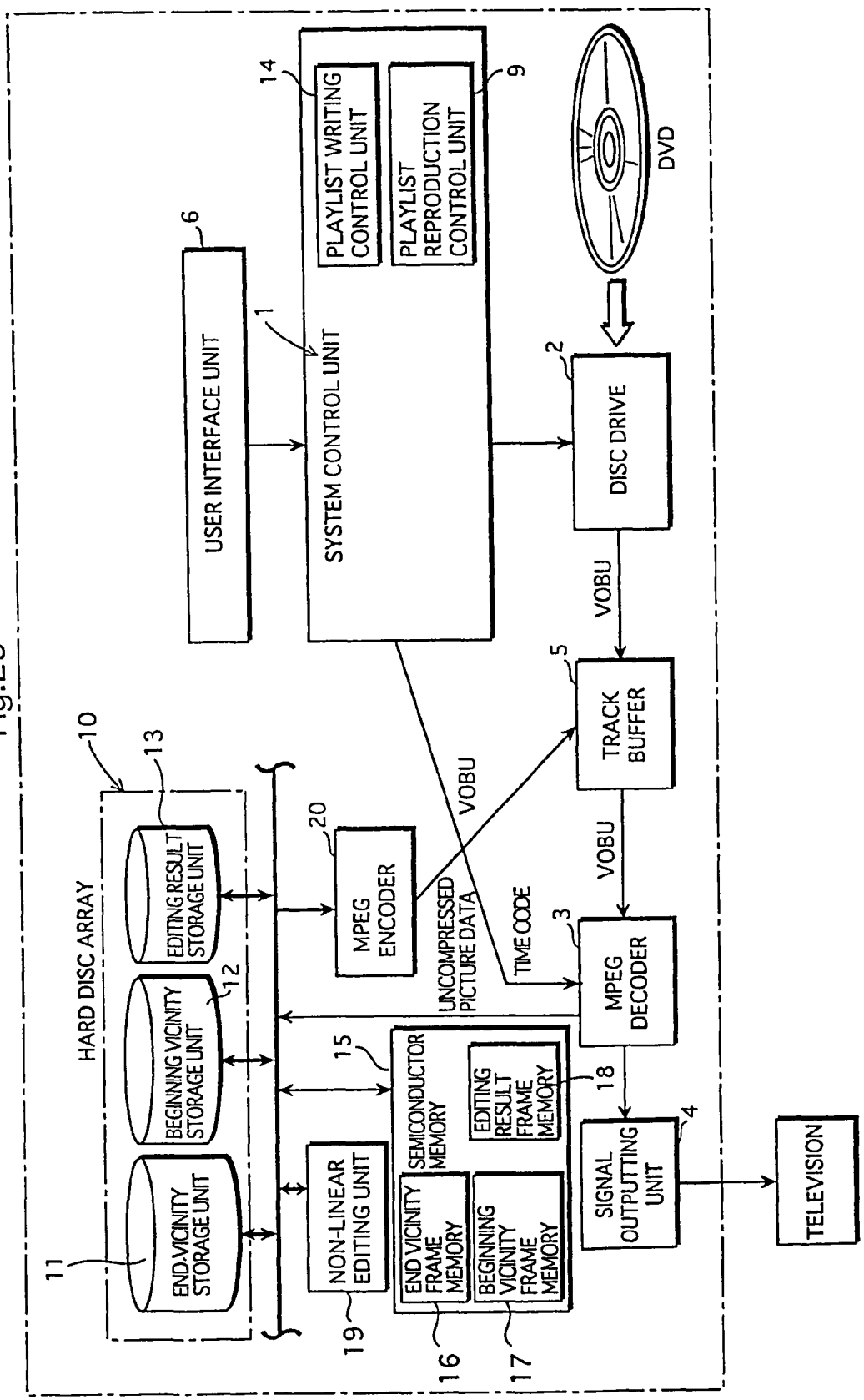
FIG. 25 is a diagram showing an internal structure of a recording apparatus relating to the fourth embodiment.

The fourth embodiment relates to a recording apparatus realizing a non-linear editing for moving image data, by using a hard disc (HD) array. FIG. 25 is a diagram showing an internal structure of a recording apparatus relating to the fourth embodiment. The recording apparatus in FIG. 25 is based on the internal structure of the reproduction apparatus shown in FIG. 20. Accordingly, the same constituting element is assigned the same reference number, and the description thereof is omitted in this embodiment. The difference existing in the recording apparatus shown in FIG. 25 from that of FIG. 20 is that 1) FIG. 25 includes a HD array 10 (including an end-vicinity storage unit 11, a beginning-vicinity storage unit 12, and an editing result storage unit 13), a semiconductor memory 15 (including an end-vicinity frame memory 16, a beginning-vicinity frame memory 17, and an editing result frame memory 18), a non-linear editing unit 19, and a MPEG encoder 20, and that 2) the Playlist writing control unit 8 is replaced by the playlist writing control unit 14.

The HD array 10 is a disc apparatus which enables a higher speed access than a DVD, and includes an end-vicinity storage unit 11, a beginning-vicinity storage unit 12, and an editing result storage unit 13. The reason why the HD array 10 stores the beginning and end vicinities is that in a non-linear editing, high-speed data transfer is required such as four times as faster than an ordinary hard disc.

The Playlist writing control unit 14 is a constituting element which is based on the Playlist writing control unit 8 shown by the first embodiment, with a difference in the action after specifying the end and beginning vicinities from that of the Playlist writing control unit 8. That is, the Playlist writing control unit 14, after specification of end and beginning vicinities at Steps S15-S16, reads the picture data constituting the end and beginning vicinities and have the MPEG decoder 3 decode the picture data. Once the picture data are converted into uncompressed picture data, the Playlist writing control unit 14 writes the uncompressed picture data constituting the end vicinity to the end-vicinity storage unit 11 belonging to the HD array 10, and the uncompressed picture data constituting the beginning vicinity to the beginning-vicinity storage unit 12. By the above transaction, the picture data, in an uncompressed state, which constitutes VOB#z and VOB#z+1 are stored in the HD array 10.

The semiconductor memory 15 includes an end-vicinity frame memory 16, a beginning-vicinity frame memory 17, and an editing result frame memory 18. Uncompressed picture data constituting the end vicinity stored in the end vicinity storage unit 11, are exploded into each frame of picture data in the end-vicinity frame memory 16. Likewise, in the beginning vicinity frame memory 17, uncompressed picture data constituting the beginning vicinity stored in the beginning vicinity storage unit 12, are exploded into each frame of picture data. Finally, the editing result frame memory 18 stores uncompressed picture data obtained by providing the uncompressed picture data stored in these frame memories with image modification.

A non-linear editing unit 19 is an application program for conducting a variety of moving image modification according to a user operation. The moving image modification performed by the non-linear editing unit 19 makes image modification for each of a plurality of uncompressed picture data stored in the end-vicinity storage unit 11 and in the beginning-vicinity storage unit 12 independently. Specifically, the non-linear editing unit 19 takes out each of the plurality of the uncompressed picture data stored in the end-vicinity storage unit 11 and the uncompressed pictured data stored in the beginning-vicinity storage unit 12 to the end-vicinity frame memory 16 and to the beginning-vicinity frame memory 17 respectively. Then, the non-linear editing unit 19 has these frame memories explode into pixel data constituting an image, and performs a pixel operation to the pixel data stored in these frame memories, and takes the result of the pixel operation to the frame memory 18. When the image modification is completed for picture data for one frame, the non-linear editing unit 19 stores the picture data stored in the editing result frame memory 18 in the editing result storage unit 13. The above mentioned modification is performed for each piece of the uncompressed picture data stored in the end-vicinity storage unit 11 and for each piece of the uncompressed picture data stored in the beginning-vicinity storage unit 12. The non-linear editing unit 19 performs an operation for each pixel, which enables more advanced modification than the various modification techniques described in the first embodiment. Examples for the image modification enabled by the non-linear editing unit 19 include a filtering which is to be performed for each piece of picture data and a layer-synthetic technique which is to be performed for a plurality of pieces of picture data at the same time, and the like. The filtering conducts a pixel operation to the pixels constituting each piece of picture data, which yields an image expression technique such as embossment, peripheral extraction, and mosaic method and the like. The layer synthetic technique is a modification technique by which each of the picture data constituting the end vicinity and the picture data constituting the beginning vicinity is assigned to a different layer, and which creates a synthetic image by overlapping these layers. Note that it is also possible to install the non-linear editing unit 19 inside the system control unit 1.

The MPEG encoder 20 encodes the uncompressed picture data written on the editing result storage unit 13, in order to obtain VOB#z and #z+1, and outputs them to the track buffer 5. The picture data outputted to the track buffer will be stored, in correspondence with the VOB information and the Temp_Cell information in the DVD, under control of the Playlist writing control unit 14 stated earlier.

As stated in the above, the present embodiment enables to write a final editing result on a DVD, while using the HD array for moving image modification which require high-speed access. This realizes more advanced image editing. In addition, the present embodiment enables specification of an editing result by means of Temp_Cell information. This facilitates a recovery in editing, by switching the set value for the Temp_Cell_FLAG.

Fifth Embodiment

Figure 26:
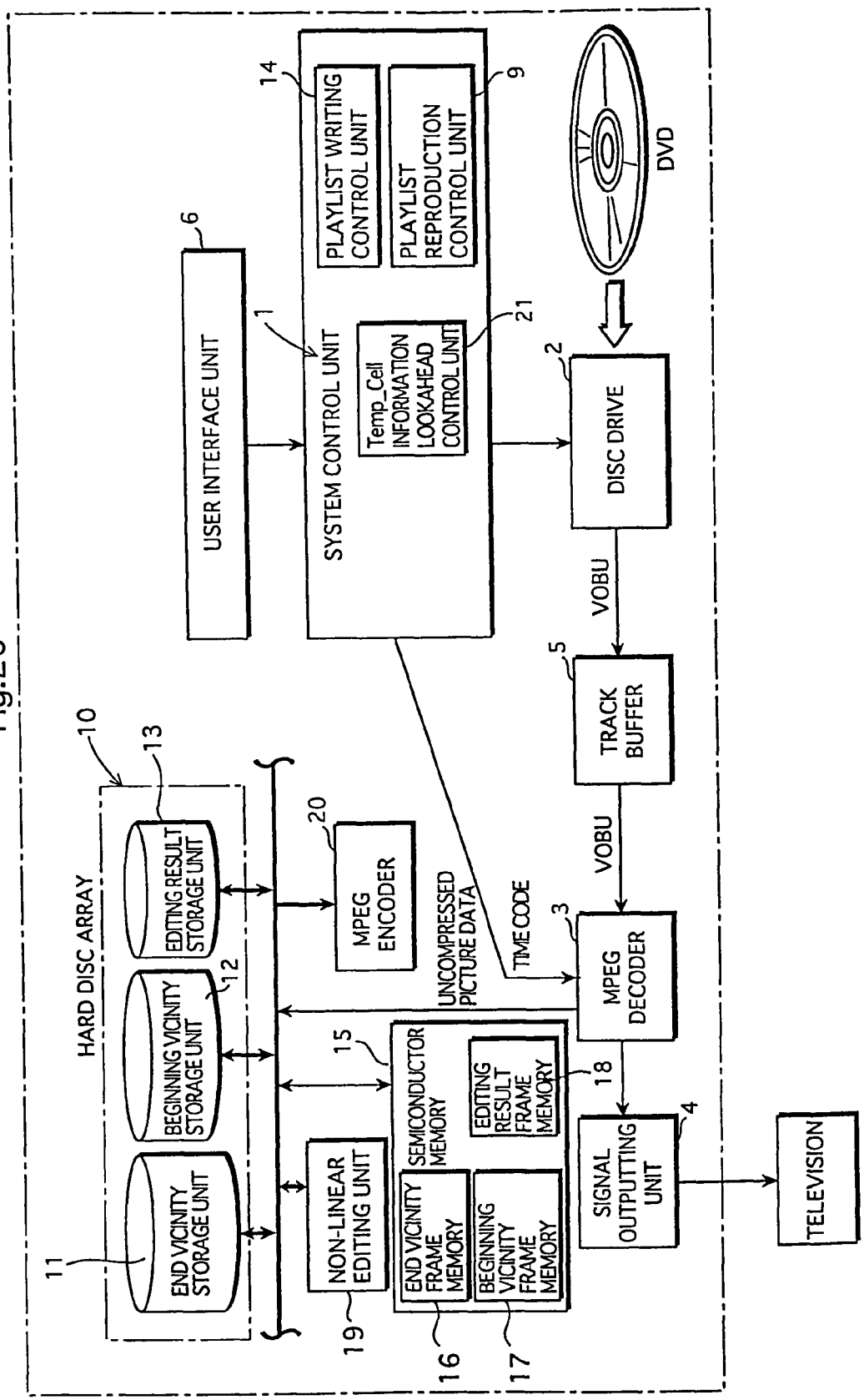
FIG. 26 is a diagram showing an internal structure of a reproduction apparatus relating to the fifth embodiment.

The fifth embodiment of the present invention relates to a reproduction apparatus equipped with a hard disc array. FIG. 26 is a diagram showing the internal structure of the reproduction apparatus relating to the fifth embodiment. The reproduction apparatus in FIG. 26 is based on the structure of the recording apparatus shown in FIG. 25. Accordingly, same constituting elements as those in FIG. 25 are assigned same reference numbers and omitted for description in this embodiment. The differences existing in the reproduction apparatus in FIG. 26 is that FIG. 26 has, inside the system control unit 1, a Temp_cell information look ahead control unit 21 and a Playlist reproduction control unit 23, and that the non-linear editing unit 19 is replaced by a non-linear editing unit 22.

The temp_Cell information look ahead control unit 21 performs look ahead processing, when the reproduction based on Playlist information is specified. When the reproduction of the reproduction section based on the Playlist information is specified, this look ahead processing is designed to read, in advance, VOB#z and #z+1 specified before the specification of the CELL information, and to output the stated VOB#z and #z+1 to the MPEG decoder 3. Then, a decoding for the read VOB#z and #z+1 is performed by the MPEG decoder 3, in order to obtain uncompressed picture data. Then, the uncompressed picture data included in the VOB#z is stored in the end-vicinity storage unit 11, and the uncompressed pictured at a included in the VOB#z+1 is stored in the beginning-vicinity storage unit 12.

The non-linear editing unit 22, in the look ahead processing of a VOB described in the above, before receiving a user operation, is able to take the uncompressed picture data stored in the end-vicinity storage unit 11 and in the beginning-vicinity storage unit 12 to the end-vicinity frame memory 16 and to the beginning-vicinity frame memory 17 respectively, and to execute the moving image edition according to the Effect_Type included in the Temp_Cell information. Here, if the Effect_Type included in the Temp_Cell information shows a fade-out, then a fade-out is performed to the uncompressed picture data constituting the VOB#z and VOB#z+1. If the Effect_Type shows a filtering or a layer synthetic, a fade-out is performed to the uncompressed pictured at a constituting VOB#z and VOB#z+1. Every time editing results for one frame are obtained, the results will be stored in the editing result storage unit 13. After the above transaction, the completion of modification will be notified to the Playlist reproduction control unit 23.

The Playlist reproduction control unit 23, for the most part, is based on the function of the Playlist reproduction control unit 9 shown by the third embodiment, but performs a peculiar transaction to the fifth embodiment. The playlist reproduction control unit 9 according to the third embodiment, after inputting the preceding reproduction section up to the VOBU# (PreEdge) (at Step S50 in FIG. 22), inputs, in the MPEG decoder 3, the VOB#z and #z+1 specified by the VOBI_SRP of the VOB#z and #z+1 that are specified by the VOBI_SRP of the Temp_Cell information. On the contrary, the Playlist reproduction control unit 23 according to the fifth embodiment reads out, from the editing result storage unit 13, the editing result obtained from the editing performed by the non-linear editing unit, in stead of reading the VOB#z and #z+1 recorded on the DVD, and inputs the editing result to the signal outputting unit 4.

The editing result stored in the editing result storage unit 13 is obtained from the editing according to the Effect_Type performed by the non-linear editing unit 22. The VOB#z and #z+1 will be replaced by this editing result, which means that in the reproduction of the Playlist information, the end vicinity of the preceding reproduction section and the beginning vicinity of the subsequent reproduction section are to be replaced by picture data with varieties of visual effects.

As seen from the above, according to the present embodiment, the VOB#z and #z+1 specified by the Temp_Cell information is read in advance in the look ahead processing and edited in advance, during the reproduction of the Playlist information. This enables the reproduction thereof immediately after the completion of the virtual editing.

Sixth Embodiment

Figure 27:
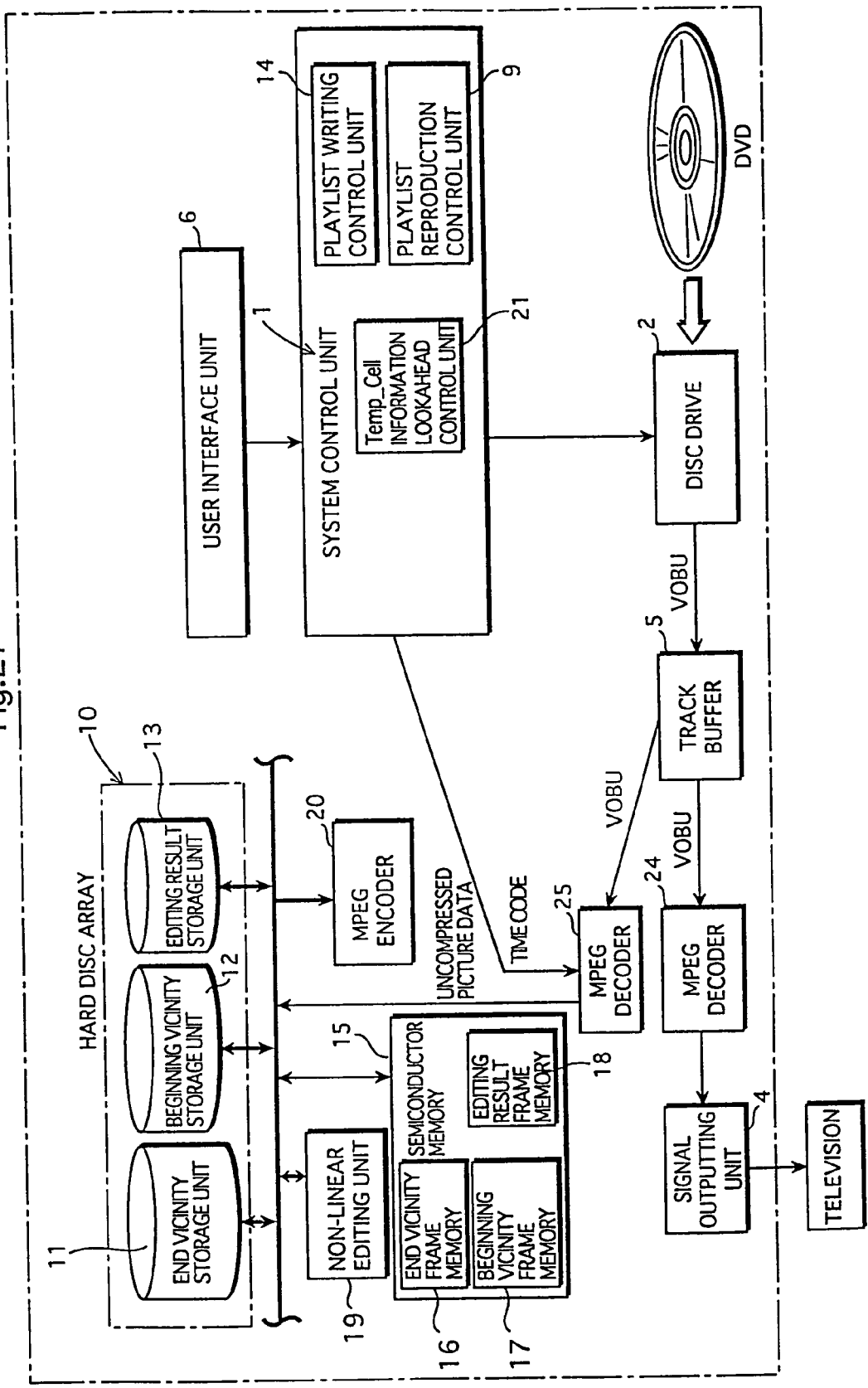
FIG. 27 is a diagram showing an internal structure of a reproduction apparatus relating to the sixth embodiment.

The sixth embodiment of the present invention is equipped with two MPEG decoders, and relates to an advanced reproduction apparatus in which the decoding of a two different types of VOBs is enabled. FIG. 27 is a diagram showing the internal structure relating to the sixth embodiment. The structure of the recording apparatus depicted in FIG. 27 is based on the structure of the reproduction apparatus depicted in FIG. 26. Accordingly, the same constituting element is assigned the same reference number, and the description thereof is omitted. The difference is that the MPEG decoder 3 in FIG. 26 is replaced by a MPEG decoder 24 and a MPEG decoder 25 in this embodiment, and the non-linear editing unit 22 is replaced by a non-linear editing unit 26.

The MPEG decoder 24, which is one MPEG decoder out of two decodes the reproduction section specified by the CELL information either from the Cell_Start_PTM or from the Trimming_Start_PTM to the Trimming_End_PTM. The other MPEG decoder 25, on the other hand, decodes the reproduction section specified by the Temp_Cell information, so as to obtain uncompressed picture data, and writes the uncompressed picture data either to the end-vicinity storage unit 11 or to the beginning-vicinity storage unit 12.

The non-linear editing unit 26 sequentially takes out, to the end-vicinity frame memory and to the beginning-vicinity frame memory 17, the uncompressed picture data stored in the end-vicinity storage unit 11 and in the beginning-vicinity storage unit 12 respectively. Then, the non-linear editing unit 26 makes a modification to the uncompressed picture data according to the Effect_Type, and stores the modification result in the editing result frame memory 18. Every time the modification to one frame of uncompressed picture data is completed, the non-linear editing unit 26 writes the modification result to the editing result storage unit 13.

The MPEG decoder 25 and the non-linear editing unit 26 perform the above stated transaction until the MPEG decoder 24 completes decoding. When the decoding of a VOB is completed by the MPEG decoder 24, the signal outputting unit 4 outputs and reproduces the uncompressed picture data stored in the editing result storage unit 13.

According to the above embodiment seen from the above, a simultaneous execution is enabled of a decoding of the reproduction section either from the Cell_Start_PTM or from the Trimming_Start_PTM to the Trimming_End_PTM, and a decoding and a moving image editing of the reproduction section specified by the Temp_Cell information. Therefore, when the Temp_Cell information is specified, a user can enjoy the visual effects such as a fade-in connection, a fade-out connection, and a cross-fade connection and the like, without even noticing that the modification to the VOB is performed.

Seventh Embodiment

Figure 28A:
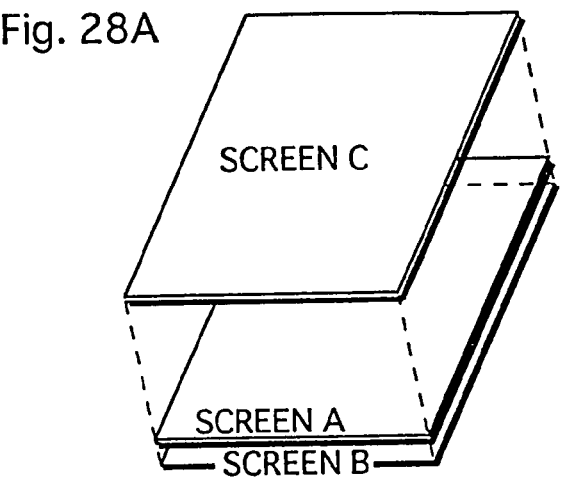
FIG. 28A-FIG. 28C are diagrams showing how a wipe transition is performed.
Figure 28B:
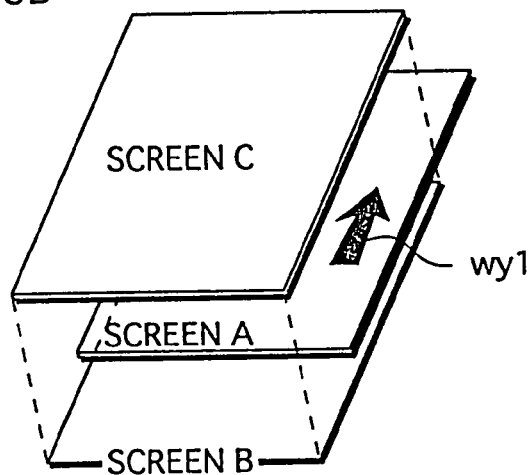
Figure 28C:
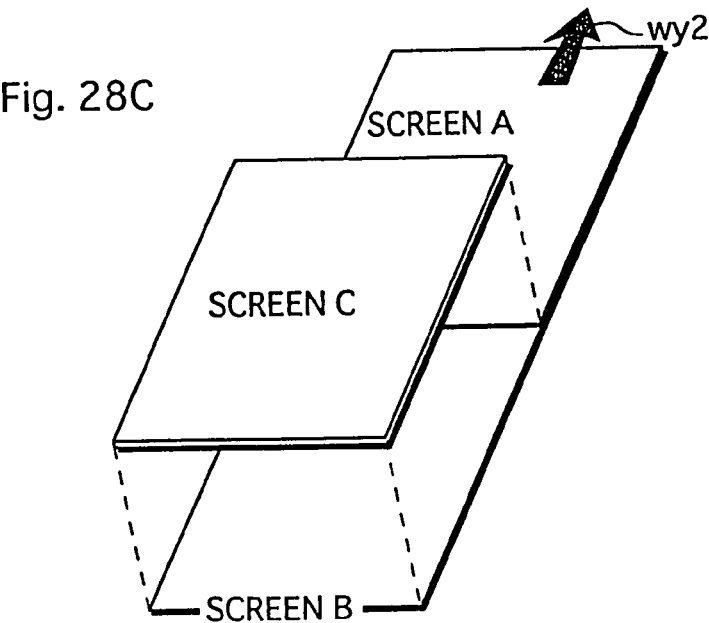

The seventh embodiment of the present invention relates to modification techniques such as a wipe, a slide, and the like, which will be added to the Effect_Type. FIG. 28A-FIG. 28C show how the wipe transition is performed, and FIG. 29A-FIG. 29C relate to how the slide transition is performed.

The wipe is a visual effect which is performed as follows. An image A included at the end of the preceding reproduction section is overlapped on an image B included in the beginning vicinity of the subsequent reproduction section, as depicted in FIG. 28A. And then, the image A at the end section will be moved either in the direction of wy1 or wy2 on the screen, in order to display, on a screen C, the image B initially hidden by the image A.

Figure 29A:
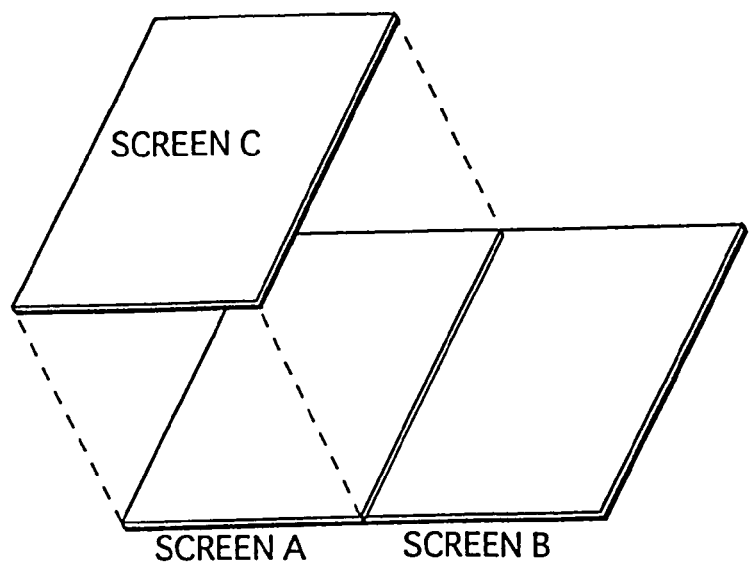
FIG. 29A-FIG. 29C are diagrams showing how a slide transition is performed.
Figure 29B:
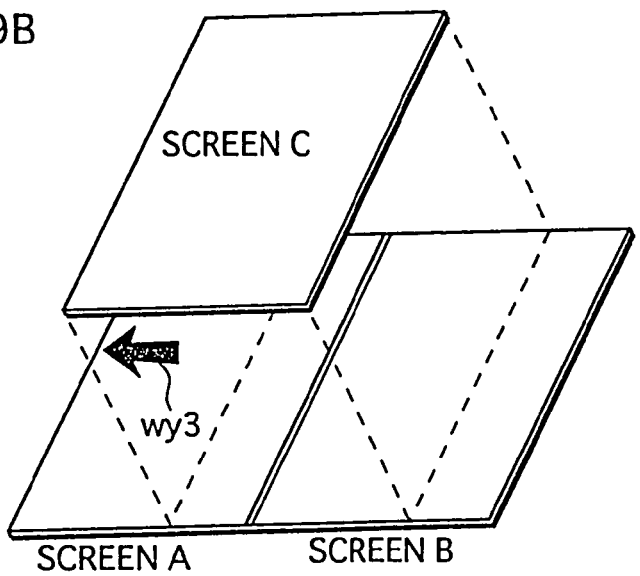
Figure 29C:
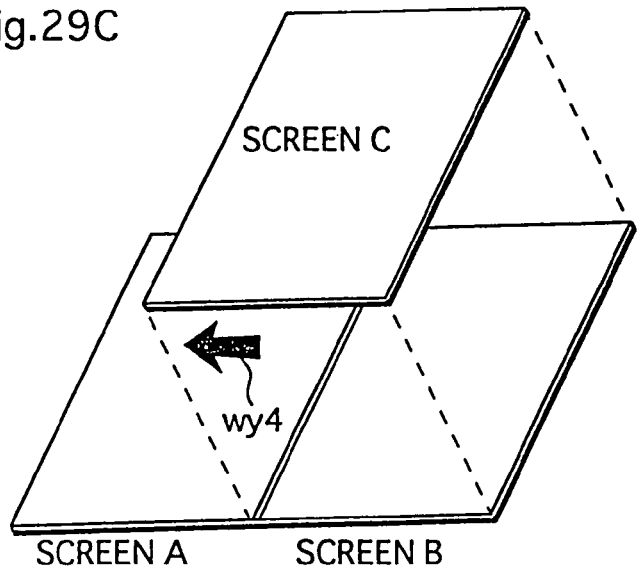

The slide is a visual effect which is performed as follows. As depicted in FIG. 29A, an image A included in the end vicinity of the preceding reproduction section and the image B included in the beginning vicinity of the subsequent reproduction section is placed adjacent to each other. Then by slightly moving the beginning vicinity image as shown by the arrows wy3, wy4, so as to push the end image A, display of the image at the beginning vicinity is performed. The recording apparatus relating to the seventh embodiment writes the Effect_Type indicating these wipe and slide to the Temp_Cell information.

Figure 30:
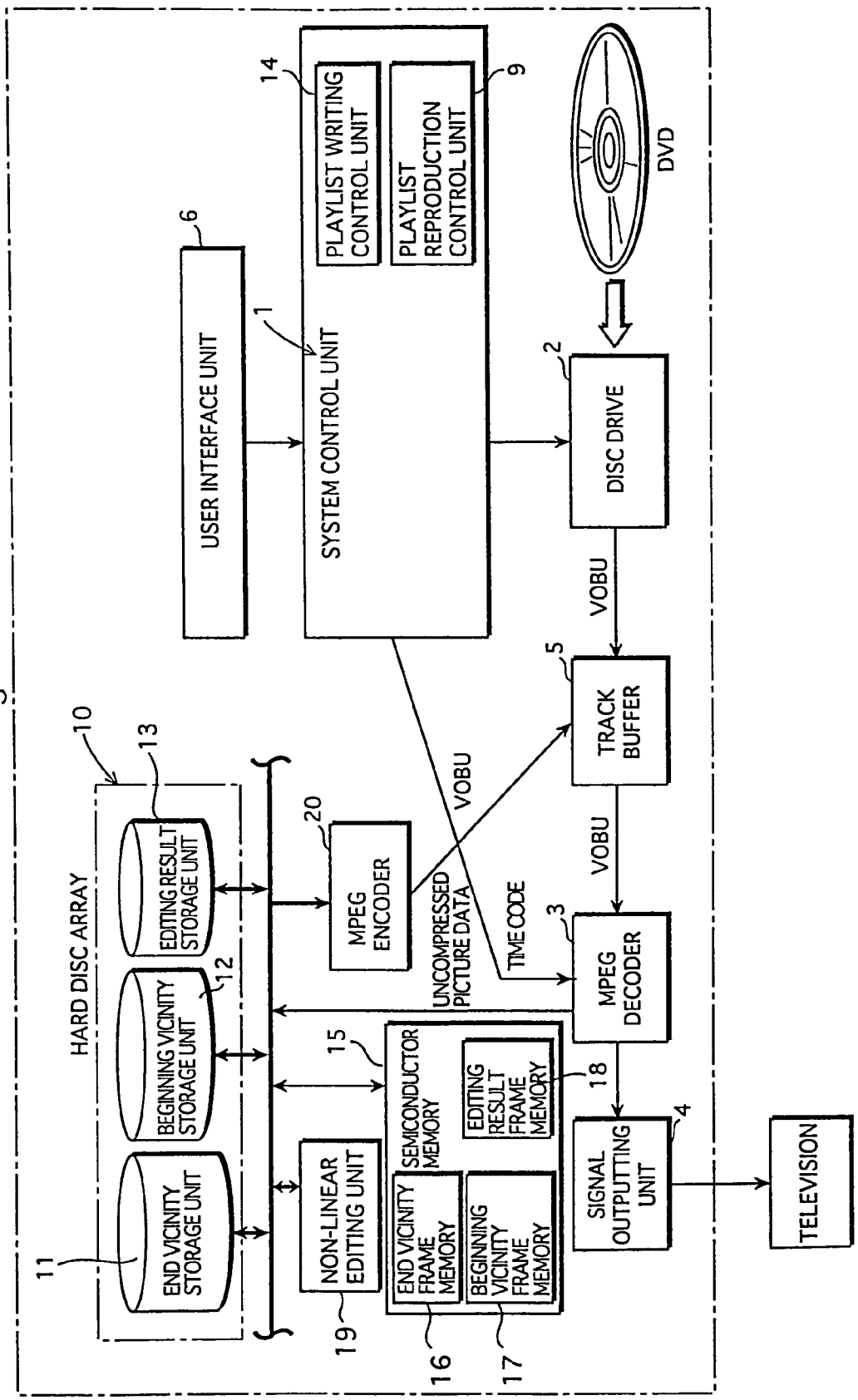
FIG. 30 is a diagram showing an internal structure of a reproduction apparatus relating to the seventh embodiment.

FIG. 30 depicts the internal structure of the reproduction apparatus concerning the seventh embodiment. As FIG. 30 shows, the reproduction apparatus is structured basically the same as the reproduction apparatus relating to the fifth embodiment shown in FIG. 25.

The MPEG decoder 3 according to the seventh embodiment converts, according to the Temp_Cell information, the picture data at the end vicinity and the picture data at the beginning vicinity into uncompressed picture data.

The non-linear editing unit 19 conducts a wipe or a slide according to the Effect_Type to the uncompressed picture data stored in the end-vicinity storage unit 11 and in the beginning-vicinity storage unit 12, and outputs the result to the signal outputting unit 4 for displaying purpose.

Seen from the above, the present embodiment enables a visual effect such as a wipe and a slide in recording the Temp_Cell information, which increases the variation in editing moving images.

Eighth Embodiment

From the first to the seventh embodiments, the duplicated part was written on a DVD as VOB#z and #z+1. In the above case, when the continuous length is short for each of the VOB#z and #z+1, an under flow might occur in the track buffer 5, between the time for the reading from the VOB#z and the reading from the VOB#z+1, or between the time for reading from the VOB#z+1 to the reading from the VOB#x+1. That is, when the continuous length is short, the visual interruption will anyways occur in reproduction, due to the under flow which occurs in the track buffer 5, even if modification depicted in any one from the first to the seventh embodiment was performed. To avoid the above, the recording apparatus in the eighth embodiment performs a transaction called "merge." The merge transaction is a technique by which VOB#z and VOB#z+1 are connected and arranged so that the data length for the connecting part exceeds a predetermined data length.

Here, the recording area in a DVD is divided into a plurality of sectors of 2048 bytes each, and further into a plurality of ECC blocks of 16 sectors each that are continuous. If the VOB is composed of a plurality of packs having 2048 bytes each, the predetermined data length will be a size corresponding to the number of ECC block which is "N_ecc" in the following expression:

$$N\_ecc = Vo*Tj/((16*8*2048)*(1-Vo/Vr))$$

In the above expression, Tj signifies a maximum jump time period in an optical pick up for the reproduction apparatus, Vr signifies a inputting-transferring rate for a track buffer (Mbps), and Vo signifies an outputting-transmitting rate for a track buffer (Mbps).

Note that the basis for the above expression is detailed in the above-mentioned U.S. Pat. No. 6,148,140 publication. Further, the duplicated part may also be defined by the recording apparatus, at the time of writing the duplicated part, so that the duplicated part satisfies the stated continuous length.

According to the present embodiment, as seen from the above, the data length of a duplicated part in a manner that the track buffer will not underflow is defined when duplication is performed, which enables to avoid an interruption in reproduction due to an underflow.

Ninth Embodiment

The ninth embodiment relates to a recording apparatus performing a modification taking into account the recording capacity of a DVD. In the second embodiment, every time a virtual editing is performed, the duplicated parts at the end and beginning vicinities are written on a DVD. This means that if the virtual editing is repeated and many pieces of CELL information is generated, the capacity of the DVD will be reduced accordingly. This increases the possibility that the optical disc becomes full. Taking this problem into account, the ninth embodiment is structured to display, to the user, whether the disc allows the modification. Only when the user's answer is positive to the modification, the modification mode is set for the recording apparatus. On the contrary, if the user's answer is not positive to the modification, then the non-modification mode is set. The recording apparatus according to the ninth embodiment is structured to perform the modification described in the second embodiment, only when the apparatus is set to be a modification mode. When the non-modification mode is set to the apparatus, the recording apparatus of the present embodiment does not perform the modification of the second embodiment. This structure enables to write many other VOBs in a DVD than the second embodiment.

In addition, when a DVD which stores duplicated parts is embedded and no empty space exists in the DVD for writing other VOBs, the recording apparatus according to the ninth embodiment displays on whether the empty space should be allocated. And when the user wishes to have an empty space, the empty space will be allocated by deleting VOBs specified by Temp_Cell information, VOB information corresponding to the VOB, and the Temp_Cell information.

According to the present embodiment, seen from the above, it can be avoided that a disc will be full, relating to recording the duplicated parts described in the second embodiment.

This is the end of the description of all the embodiments. Note that the above are only examples of systems that can be hoped to yield the best effects. Therefore, the modifications within the scope of the purpose of this invention are possible. A representative modification examples include the following (A), (B), (C), and so on.

(A) From the first to the seventh embodiments, parts to be duplicated are an end part of a preceding reproduction section and a beginning part of a subsequent reproduction section. However, it is also possible to duplicate any part inside a VOB, and to have Temp_Cell information specify the part. From the first to seventh embodiments, an example in which each of the VOB#x, and #x+1 has two or more reproduction sections respectively is described. However, it is also possible that a VOB has two or more reproduction sections.

(B) From the first to seventh embodiments, an assumption is made that a DVD such as DVD-RAM, DVD-RW and the like, which can record moving image data in accordance with the DVD-video recording standard for a recording medium. However, if it is a recording medium that can record moving image data, the physical structure does not matter. For example, it is possible to use a phase change optical disc other than DVD-RAM, DVD-RW, such as a PD, DVD+RW, CD-RW, and the like. Further, a write once type optical disc such as CD-R, DVD-R and the like (i), a magneto-optical recording disc such as MO (Magneto-optical disc), MD-DAT (Mini disc-Data), iD format and the like (ii), a removable hard disc drive such as ORB, Jaz, SparQ, SyJet, EzFley, micro drives and the like (iii), a magneto recording disc such as floppy discs, SuperDisk, Zip, Clik! and the like (iv), flash memory cards such as SD memory cards, Compact Flashcard, SmartMedia, memory stick, multimedia card, PCM-CIA card and the like (v).

(C) In case that a DVD is used for a computer recording medium, the following structure works. That is, the disc drive 2 is structured as a DVD drive apparatus which is connected to a computer bus through an interface which is in accordance with the SCSI, IDE, or IEEE1394. Further, other constituting elements than the disc drive 2 in the corresponding figures will perform their function by having the OS or an application program executed on a computer hardware.

(D) In the embodiments, video streams and audio streams are multiplexed in a VOB. However, it is also possible to multiplex them with a sub-video stream in which run-length compression is performed on caption text, or with other control information.

(E) In the present embodiments, description is based on a video frame for a display period of picture data. However, for compressing 24 frame/second image such as a film material, 3:2 pull-down is used. In such a case, there is a possibility that 1.5 frame=1 picture, as opposed to 1 frame=1 picture. The present invention does not, in substance, depend on a video frame, and is applicable to various frames per unit time. The embodiments are not limited to the video frame accordingly.

(F) In the specification, a modification apparatus was not described. This is because the recording apparatus and the apparatus which performs moving image modification are dealt with as a different apparatus in the market. That is, the writing of AV files or management files are usually performed by a DVD recorder which is one of consumer appliances, such as DMR-E20 by Panasonic and the like. On the contrary, the above modification is frequently performed by a personal computer to which an external drive apparatus is connected through a connector IEEE1394, and in which a digital image editing program such as "Motion DV STUDIO" and "DVD MovieAlbum" is installed.

However, the present specification does not exclude a possibility of a single-piece construction between a recording apparatus and a modification apparatus. Therefore, the above mentioned modification apparatus and the recording apparatus or the reproduction apparatus described in any one of the second-ninth embodiments are constructed as a single-piece. Therefore, although from the second to the ninth embodiments, the recording apparatus and the reproduction apparatus are described as a different embodiment from each other, the purpose is to facilitate understanding, and it is also possible to use the recording apparatus and the reproduction apparatus as a single-piece.

(G) In all the embodiments described, an optical disc is to record several kinds of data in a format in accordance with the DVD-Video recording standard. However, other recording standards will do if they assume that the data will be edited.

(H) From the fourth to sixth embodiments, the description was based on a hard disc array as an example. However, one hard disc may replace the hard disc array.

(I) In all the embodiments, Temp_Cell_FLAG is used for switching between reproduction "via" and "not via" the duplicated part. However, it is also possible to perform switching according to a user operation without using this Temp_Cell_FLAG.

Although the present invention has been fully described by way of example with reference to accompanying drawing, it is to be noted that various changes and modifications will be apparent to those skilled in the art. Therefore, unless otherwise such changes and modifications depart from scope of the present invention, they should be constructed as being included therein.

What is claimed is:

1. A recording apparatus for an optical disc that stores thereon moving image data composed of a plurality of pieces of picture data and pieces of reproduction section information that specify reproduction sections on the moving image data, the recording apparatus comprising:
a reception unit operable to receive, from an operator, an operation to specify first reproduction section information that indicates a first reproduction section and second reproduction section information that indicates a second reproduction section;
a duplication unit operable to duplicate an end vicinity of the first reproduction section and a beginning vicinity of the second reproduction section in order to obtain a duplicated part, the end vicinity being composed of a predetermined number of pieces of picture data, and the beginning vicinity being composed of a predetermined number of pieces of picture data;
a writing unit operable, (i) when the duplicated part and temporary section information that specifies a reproduction section of the duplicated part are able to be written onto the optical disc, to write status information set to ON onto the optical disc, (ii) when the duplicated part and the temporary section information are not able to be written onto the optical disc, to write the status information set to OFF onto the optical disc, wherein
the duplicated part is a group of pieces of picture data obtained by duplicating the end vicinity and the beginning vicinity,
when the status information is set to ON, the first reproduction section information and the second reproduction section information show, to a reproduction apparatus, a reproduction path for reproducing a part before the end vicinity and a part after the beginning vicinity via the duplicated part, and
when the status information is set to OFF, the first reproduction section information and the second reproduction section information show, to the reproduction apparatus, a reproduction path for sequentially reproducing the first reproduction section and the second reproduction section without using the duplicated part.

2. The recording apparatus of claim 1, further comprising
a judgment unit operable to judge whether a sum of a size of the end vicinity and a size of the beginning vicinity is smaller than a predetermined size, wherein
the duplication unit writes the duplicated part onto the optical disc, only when the judgment unit has judged that the sum is smaller than the predetermined size.

3. The recording apparatus of claim 2, wherein
the duplicated part is a part to be modified,
the moving image data is a compression-encoded picture data sequence, and the modification is performed in order to seamlessly reproduce the end vicinity and the beginning vicinity, and
the duplication unit duplicates all of, which require modification, the end vicinity and the beginning vicinity.

4. The recording apparatus of claim 1, wherein
the duplication unit connects the duplicated parts together so that a continuous length of the connected part on the optical disc is larger than a predetermined length and writes the connected part onto the optical disc.

5. A recording method relating to an optical disc that stores thereon moving image data composed of a plurality of pieces of picture data and pieces of reproduction section information that specify reproduction sections on the moving image data, the recording method comprising:
a reception step of receiving, from an operator, an operation to specify first reproduction section information that indicates a first reproduction section and second reproduction section information that indicates a second reproduction section;
a duplication step of duplicating an end vicinity of the first reproduction section and a beginning vicinity of the second reproduction section in order to obtain a duplicated part, the end vicinity being composed of a predetermined number of pieces of picture data, and the beginning vicinity being composed of a predetermined number of pieces of picture data;
a writing step, (i) when the duplicated part and temporary section information that specifies a reproduction section of the duplicated part are able to be written onto the optical disc, of writing status information set to ON onto the optical disc, (ii) when the duplicated part and the temporary section information are not able to be written onto the optical disc, of writing the status information set to OFF onto the optical disc, wherein
the duplicated part is a group of pieces of picture data obtained by duplicating the end vicinity and the beginning vicinity,
when the status information is set to ON, the first reproduction section information and the second reproduction section information show, to a reproduction apparatus, a reproduction path for reproducing a part before the end vicinity and a part after the beginning vicinity via the duplicated part, and
when the status information is set to OFF, the first reproduction section information and the second reproduction section information show, to the reproduction apparatus, a reproduction path for sequentially reproducing the first reproduction section and the second reproduction section without using the duplicated part.

* * * * *